United States Patent
Nam et al.

(10) Patent No.: US 9,585,136 B2
(45) Date of Patent: *Feb. 28, 2017

(54) METHOD AND SYSTEM FOR INDICATING METHOD USED TO SCRAMBLE DEDICATED REFERENCE SIGNALS

(71) Applicant: Samsung Electronics Co., Ltd., Suwon-si, Gyeonggi-do (KR)

(72) Inventors: Young-Han Nam, Plano, TX (US); Jianzhong Zhang, Plano, TN (US); Jin-Kyu Han, Allen, TX (US); Lingjia Liu, Overland Park, KS (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 198 days.

This patent is subject to a terminal disclaimer.

(21) Appl. No.: 14/457,718

(22) Filed: Aug. 12, 2014

(65) Prior Publication Data
US 2015/0036625 A1    Feb. 5, 2015

Related U.S. Application Data

(63) Continuation of application No. 13/603,083, filed on Sep. 4, 2012, now Pat. No. 8,805,448, which is a
(Continued)

(51) Int. Cl.
*H04W 72/04* (2009.01)
*H04B 7/04* (2006.01)
(Continued)

(52) U.S. Cl.
CPC .......... *H04W 72/042* (2013.01); *H04B 7/043* (2013.01); *H04B 7/0452* (2013.01);
(Continued)

(58) Field of Classification Search
CPC ...... H04W 16/18; H04W 16/24; H04W 24/00
See application file for complete search history.

(56) References Cited

U.S. PATENT DOCUMENTS 9,025,538 B2    5/2015   Dai et al.
2003/0220103 A1*  11/2003  Kim .................. H04B 7/0626
                                          455/422.1
(Continued)

FOREIGN PATENT DOCUMENTS

CN    101651995 A    2/2010
CN    101827444 A    9/2010
(Continued)

OTHER PUBLICATIONS

Chinese Office Action dated Sep. 16, 2014 in copnnection with Chinese Patent Application No. 2010800364636; 22 pages.
(Continued)

*Primary Examiner* — Andrew Lai
*Assistant Examiner* — Hoyet H Andrews, III

(57) ABSTRACT

A base station includes a transmit path circuitry to scramble CRC bits of a DCI format using a C-RNTI for dynamic scheduling, and scramble the CRC bits of the DCI format using an SPS C-RNTI for semi-persistent scheduling. If C-RNTI is used, the circuitry generates a downlink transmission grant using the DCI format being a fallback format to indicate a transmit diversity transmission scheme or a single-layer beamforming scheme, and uses the DCI format being a dual-layer beamforming format to indicate a dual-DRS port transmission scheme or a single-DRS port transmission scheme. If SPS C-RNTI is used, the circuitry generates a downlink transmission grant using the DCI format being the fallback format to indicate a single-DRS port transmission scheme, and uses the DCI format being the dual-layer beamforming format to indicate a dual-DRS port
(Continued)

transmission scheme or a single-DRS port transmission scheme.

20 Claims, 26 Drawing Sheets

Related U.S. Application Data continuation of application No. 12/797,418, filed on Jun. 9, 2010, now Pat. No. 8,260,356.

(60) Provisional application No. 61/268,950, filed on Jun. 18, 2009, provisional application No. 61/269,886, filed on Jun. 30, 2009, provisional application No. 61/273,646, filed on Aug. 6, 2009.

(51) Int. Cl.
| | |
|---|---|
| *H04B 7/06* | (2006.01) |
| *H04L 5/00* | (2006.01) |
| *H04L 1/00* | (2006.01) |
| *H04W 8/26* | (2009.01) |
| *H04W 72/12* | (2009.01) |
| *H04W 76/02* | (2009.01) |
| *H04W 88/08* | (2009.01) |
| *H04W 88/02* | (2009.01) |

(52) U.S. Cl.
CPC ......... *H04B 7/0689* (2013.01); *H04L 1/0031* (2013.01); *H04L 1/0061* (2013.01); *H04L 5/0023* (2013.01); *H04L 5/0051* (2013.01); *H04L 5/0053* (2013.01); *H04L 5/0094* (2013.01); *H04L 1/0025* (2013.01); *H04W 8/26* (2013.01); *H04W 72/12* (2013.01); *H04W 76/02* (2013.01); *H04W 88/02* (2013.01); *H04W 88/08* (2013.01)

(56) References Cited

U.S. PATENT DOCUMENTS

| | | | | |
|---|---|---|---|---|
| 2007/0149218 | A1* | 6/2007 | Lee | G01S 19/14 455/456.3 |
| 2008/0117891 | A1* | 5/2008 | Damnjanovic | H04W 72/04 370/345 |
| 2009/0245194 | A1* | 10/2009 | Damnjanovic | H04L 1/1607 370/329 |
| 2010/0151874 | A1 | 6/2010 | Cai et al. | |
| 2010/0165943 | A1 | 7/2010 | Kato et al. | |
| 2010/0255852 | A1* | 10/2010 | Chen | H04W 72/082 455/450 |
| 2010/0279628 | A1 | 11/2010 | Love et al. | |
| 2012/0044881 | A1* | 2/2012 | Luo | H04B 7/0404 370/329 |
| 2013/0021991 | A1 | 1/2013 | Ko et al. | |
| 2013/0028134 | A1 | 1/2013 | Wang et al. | |

FOREIGN PATENT DOCUMENTS

| | | |
|---|---|---|
| CN | 102422584 A | 4/2012 |
| CN | 102714879 A | 10/2012 |
| EP | 2482609 A1 | 8/2012 |
| JP | 2013504921 A | 2/2013 |
| WO | WO 2008/153095 A1 | 12/2008 |

OTHER PUBLICATIONS

3GPP TSG RAN WG1 #57bis; "Discussions on DCI formats for Enhanced DL Beamforming"; R1-092650; Los Angeles, CA; Jun. 29-Jul. 3, 2009; 2 pages.
3GPP TSG RAN WG1 #57bis; "Discussions on DCI formats for Enhanced DL Beamforming"; R1-092972; Los Angeles, CA; Jun. 29-Jul. 3, 2009; 3 pages.
3GPP TSG RAN WG1 #57bis; "Dual layer beamforming based on partial channel information"; R1-092848; Los Angeles, CA; Jun. 29-Jul. 3, 2009; 6 pages.
3GPP TSG RAN WG1 #57; "LTE DL Beamforming performance and evolution to dual stream"; R1-091753; San Francisco, CA; May 4-8, 2009; 7 pages.
3GPP TS 36.213 V8.7.0; "Evolved Universal Terrestrial Radio Access (E-UTRA); Physical layer procedures"; May 2009; 6 pages.
3GPP TSG RAN WG1 #55bis; "Further Discussions for Enhanced Beamforming Technique"; R1-090186; Ljubljana, Slovenia; Janury 12-16, 2009; 8 pages.
3GPP TSG RAN WG1 #57; "Control Signaling for Enhanced DL transmission for LTE"; R1-091933; San Francisco, CA; May 4-8, 2009; 11 pages.
Translated Japanese Office Action dated Oct. 5, 2015 in copnnection with Japanese Patent Application No. 2014-195675; 9 pgs.
European Patent Office, "Supplementary European Search Report," Application No. 10789762.1-1851, Dec. 9, 2016, 13 pages, publisher EPO, Munich, Germany, place of search The Hague.
Nortel: "Draft CR to align descriptions in 36.213 with 36.211," XP050338986, R1-091400, Mar. 18, 2009, 6 pages.
Panasonic: "Clarification of RNTI reception on PDCCH," XP050317521, R1-084235, Nov. 4, 2008, 10 pages.
Philips et al: "Corrections to transmission modes." XP050318360, R1-090466, Jan. 19, 2009, 24 pages.

* cited by examiner

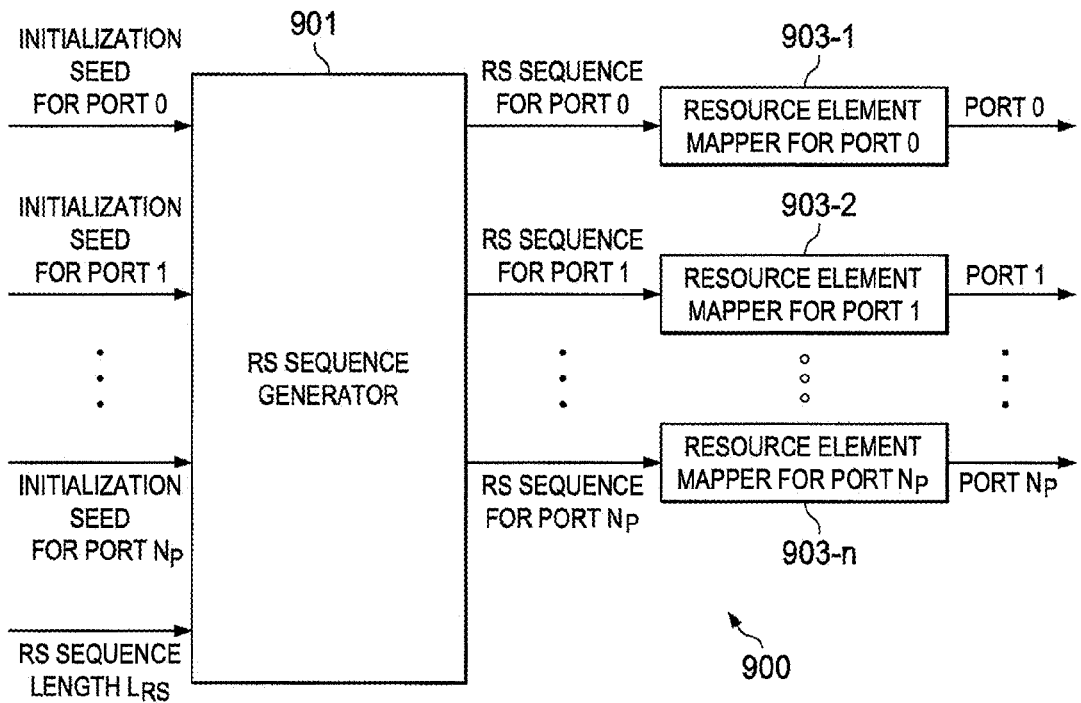

FIG. 9

| TRANSMISSION MODE A | DCI FORMAT | SEARCH SPACE | TRANSMISSION SCHEME OF PDSCH CORRESPONDING TO PDCCH | DRS INDICATION METHOD |
|---|---|---|---|---|
| PDCCH AND PDSCH CONFIGURED BY C-RNTI | DCI FORMAT 1A | COMMON AND UE SPECIFIC | TRANSMIT DIVERSITY OR SINGLE-LAYER BEAMFORMING | NOT NEEDED |
| | DCI FORMAT 2A' | UE SPECIFIC | DUAL-DRS PORT OR SINGLE-DRS PORT | METHOD AND SYSTEM OF THE PRESENT DISCLOSURE |
| PDCCH AND PDSCH CONFIGURED BY SPS C-RNTI | DCI FORMAT 1A | COMMON AND UE SPECIFIC | SINGLE DRS PORT | DRS PORT ASSIGNED SEMISTATICALLY (AN EXAMPLE: BY HIGHER LAYER) |
| | DCI FORMAT 2A' | UE SPECIFIC | DUAL-DRS PORT OR SINGLE-DRS PORT | METHOD AND SYSTEM OF THE PRESENT DISCLOSURE |

| ENABLED TBs | TB-TO-CW SWAP BIT | ENABLED CWs | ASSIGNED DRS INDICES |
|---|---|---|---|
| TB1 | 0 | 0 | 0 |
| TB1 | 1 | 1 | 1 |
| TB2 | 0 | 1 | 1 |
| TB2 | 1 | 0 | 0 |
| TB1, TB2 | 0 OR 1 | 0 AND 1 | 0 AND 1 |

| NDI BIT | 0 | 1 |
|---|---|---|
| DRS PORT INDEX | 0 | 1 |

| STATE | DRS SCRAMBLING METHOD |
|---|---|
| 1 | CELL-SPECIFIC SCRAMBLING |
| 2 | UE SPECIFIC SCRAMBLING |

| NEW 1-BIT FIELD ADDED TO THE DCI FORMAT | STATE | DRS SCRAMBLING METHOD |
|---|---|---|
| 0 | 1 | CELL-SPECIFIC SCRAMBLING |
| 1 | 2 | UE SPECIFIC SCRAMBLING |

| DCI FORMAT | TRANSMISSION MODE | TRANSMISSION SCHEME | CODEPOINTS IN DL GRANT | STATE | DRS SCRAMBLING METHOD |
|---|---|---|---|---|---|
| UE RECEIVE DCI FORMAT THAT SUPPORTS UP TO 2 TBs, e.g. 2A OR 2A' | PDCCH AND PDSCH CONFIGURED BY EITHER C-RNTI OR SPS-RNTI | SINGLE-DRS PORT OR MULTI-DRS PORT (INCLUDING 2 DRS PORT) | (TB1 ENABLED, TB2 DISABLED); OR (TB1 DISABLED, TB2 ENABLED) | 1 | CELL-SPECIFIC SCRAMBLING |
| | | | BOTH TB1 AND TB2 ENABLED | 2 | UE-SPECIFIC SCRAMBLING |
| UE RECEIVE DCI FORMAT THAT SUPPORTS ONLY 1 TB, e.g. 1A OR 1A' | PDCCH AND PDSCH CONFIGURED BY C-RNTI OR SPS-RNTI (*) | TRANSMIT DIVERSITY IF Tx ANTENNA NUMBER >2; SINGLE-PORT OTHERWISE | n/a -- FIXED AND NOT DEPENDENT ON MESSAGE FIELDS IN DL GRANT | 2 | UE-SPECIFIC SCRAMBLING, IF DRS IS CONFIGURED |
| | | SINGLE-DRS PORT | n/a -- FIXED AND NOT DEPENDENT ON MESSAGE FIELDS IN DL GRANT | 1 | CELL-SPECIFIC SCRAMBLING |

(*) CURRENT REL-8 ONLY ALLOWS COMBINATION OF C-RNTI WITH TRANSMIT DIVERSITY, AND SPS-RNTI WITH SINGLE DRS-PORT TRANSMISSION SCHEME. HOWEVER, IN REL-9 AND BEYOND, THE OTHER TWO COMBINATIONS (C-RNTI WITH SINGLE DRS-PORT, AND SPS-RNTI WITH TRANSMIT DIVERSITY) MAY ALSO BE POSSIBLE

| DCI FORMAT | TRANSMISSION MODE | TRANSMISSION SCHEME | CODEPOINTS IN DL GRANT | | STATE | DRS SCRAMBLING METHOD (SU/MU) |
|---|---|---|---|---|---|---|
| | | | NUMBER OF ENABLED TBs | BIT TO BE REINTERPRETED IN THE GRANT | | |
| UE RECEIVE DCI FORMAT THAT SUPPORTS UP TO 2 TBs, e.g. 2A OR 2A' | PDCCH AND PDSCH CONFIGURED BY EITHER C-RNTI OR SPS-RNTI | SINGLE-DRS PORT OR MULTI-DRS PORT (INCLUDING 2 DRS PORT) | (TB1 ENABLED, TB2 DISABLED); OR (TB1 DISABLED, TB2 ENABLED) | 0 | 1 | CELL-SPECIFIC SCRAMBLING (MU-MIMO, TOTAL RANK >1 **) |
| | | | | 1 | 2 | UE-SPECIFIC SCRAMBLING (SU-MIMO, TOTAL RANK 1) |
| | | | BOTH TB1 AND TB2 ENABLED | | 2 | UE-SPECIFIC SCRAMBLING (SU-MIMO, TOTAL RANK >1 **) |
| UE RECEIVE DCI FORMAT THAT SUPPORTS ONLY 1 TB, e.g. 1A OR 1A' | PDCCH AND PDSCH CONFIGURED BY C-RNTI OR SPS-RNTI (*) | TRANSMIT DIVERSITY IF Tx ANTENNA NUMBER >2; SINGLE-PORT OTHERWISE | n/a -- FIXED AND NOT DEPENDENT ON MESSAGE FIELDS IN DL GRANT | | 2 | UE-SPECIFIC SCRAMBLING, IF DRS IS CONFIGURED (SU-MIMO) |
| | | SINGLE-DRS PORT | n/a -- FIXED AND NOT DEPENDENT ON MESSAGE FIELDS IN DL GRANT | | 1 | CELL-SPECIFIC SCRAMBLING (SU OR MU) |

**, HERE TOTAL RANK >1 IS A GENERAL FORMULA. IN THE CASE OF DUAL-LAYER BEAMFORMING, TOTAL RANK IS 2

3200
| NUMBER OF STREAMS (RANK) | DRS RE SET INDEX (I_SET) | STREAM INDEX WITHIN THE SET (I_STREAM_SET) | SELECTED STREAM INDICES |
|---|---|---|---|
| 1 | 0 | 0 | 0 |
|  | 0 | 1 | 1 |
|  | 1 | 0 | 2 |
|  | 1 | 1 | 3 |
| 2 | 0 | 0, 1 | 0, 1 |
|  | 1 | 0, 1 | 2, 3 |
FIG. 32
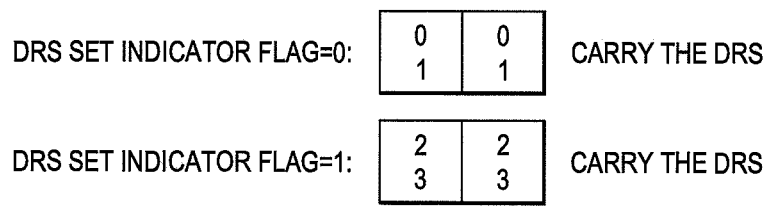
FIG. 33
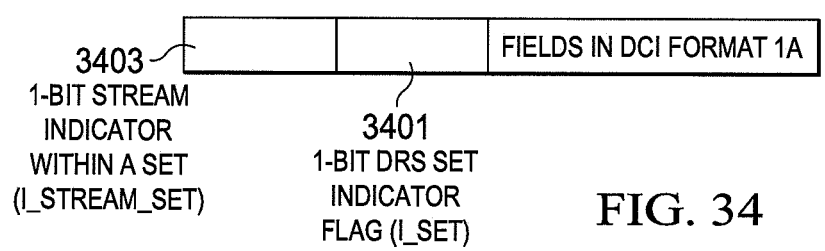
FIG. 34

| ENABLED CWs | DRS SET INDICATOR FLAG | ASSIGNED DRS INDICES |
|---|---|---|
| 0 | 0 | 0 |
|   | 1 | 2 |
| 1 | 0 | 1 |
|   | 1 | 3 |
| 0 AND 1 | 0 | 0 AND 1 |
|   | 1 | 2 AND 3 |

DRS SET INDICATOR FLAG=0:  | 0 | 0 |   CARRY THE DRS
                           | 1 | 1 |

DRS SET NUMBER FIELD=0:    | 2 | 2 |   CARRY DATA SYMBOLS
                           | 3 | 3 |

DRS SET NUMBER FIELD=1:    | 2 | 2 |   CARRY DRS FOR OTHER UEs
                           | 3 | 3 |

DRS SET INDICATOR FLAG=1:  | 2 | 2 |   CARRY THE DRS
                           | 3 | 3 |

DRS SET NUMBER FIELD=0:    | 0 | 0 |   CARRY DATA SYMBOLS
                           | 1 | 1 |

DRS SET NUMBER FIELD=1:    | 0 | 0 |   CARRY DRS FOR OTHER UEs
                           | 1 | 1 |

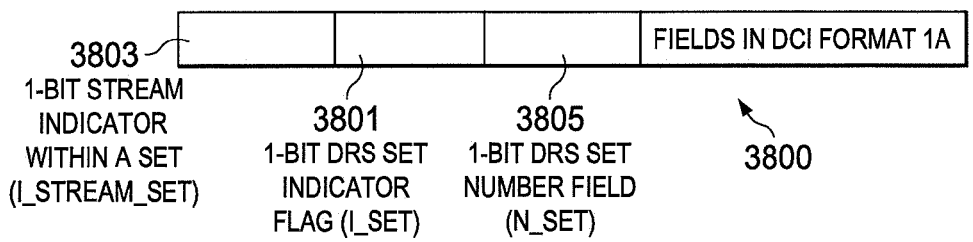
FIG. 38
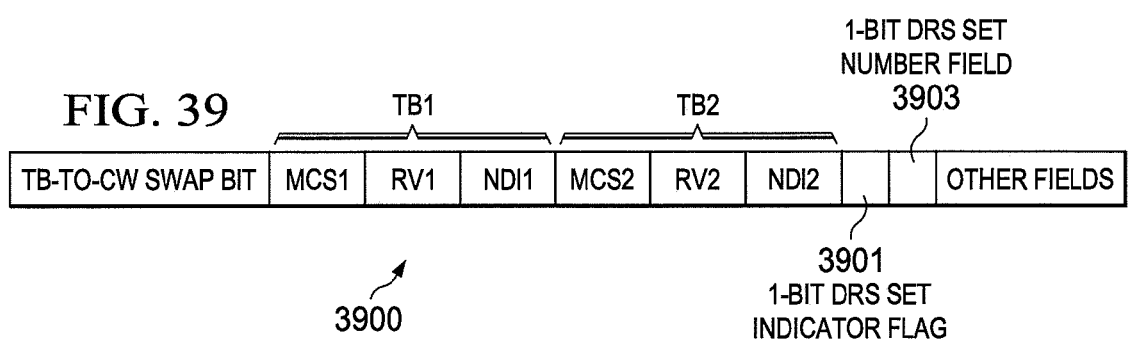
FIG. 39
FIG. 40
FIG. 41

METHOD AND SYSTEM FOR INDICATING METHOD USED TO SCRAMBLE DEDICATED REFERENCE SIGNALS

CROSS-REFERENCE TO RELATED APPLICATION(S) AND CLAIM OF PRIORITY

This application is a continuation of U.S. Non-Provisional patent application Ser. No. 13/603,083 filed Sep. 4, 2012 and entitled "METHOD AND SYSTEM FOR INDICATING METHOD USED TO SCRAMBLE DEDICATED REFERENCE SIGNALS," which is a continuation of U.S. Non-Provisional patent application Ser. No. 12/797,418 filed Jun. 9, 2010 and also entitled "METHOD AND SYSTEM FOR INDICATING METHOD USED TO SCRAMBLE DEDICATED REFERENCE SIGNALS," and claims priority to U.S. Provisional Patent Application No. 61/268,950 filed Jun. 18, 2009 and entitled "SIGNALING FOR MULTI-USER MIMO TRANSMISSIONS IN WIRELESS COMMUNICATION SYSTEMS," to U.S. Provisional Patent Application No. 61/269,886, filed Jun. 30, 2009 and entitled "SIGNALING METHODS FOR MULTI-USER MIMO TRANSMISSIONS IN WIRELESS COMMUNICATION SYSTEMS," and to U.S. Provisional Patent Application No. 61/273,646 filed Aug. 6, 2009 and entitled "METHODS OF MULTI-USER MIMO TRANSMISSIONS IN WIRELESS COMMUNICATION SYSTEMS." The content of the above-identified patent documents is hereby incorporated by reference.

TECHNICAL FIELD

The present application relates generally to wireless communications and, more specifically, to a method and system for indicating the method used to scramble dedicated reference signals.

BACKGROUND

In $3^{rd}$ Generation Partnership Project Long Term Evolution (3GPP LTE), Orthogonal Frequency Division Multiplexing (OFDM) is adopted as a downlink (DL) transmission scheme.

SUMMARY

A base station is provided. The base station comprising a transmit path circuitry configured to scramble cyclic redundancy check (CRC) bits of a downlink control information (DCI) format using a cell radio network temporary identifier (C-RNTI) for dynamic scheduling, and scramble the CRC bits of the DCI format using a semi-persistent scheduling (SPS) C-RNTI for semi-persistent scheduling.

If C-RNTI is used to scramble the CRC bits, the transmit path circuitry generates a downlink transmission grant using the DCI format being a fallback format to indicate a transmit diversity transmission scheme or a single-layer beamforming scheme, and transmits the downlink transmission grant in a common or user equipment-specific search space of a control channel (CCE) domain. The transmit path circuitry also generates a downlink transmission grant using the DCI format being a dual-layer beamforming format to indicate a dual-dedicated reference signal (DRS) port transmission scheme or a single-DRS port transmission scheme, and transmits the downlink transmission grant in a user equipment-specific search space of the CCE domain.

If SPS C-RNTI is used to scramble the CRC bits, the transmit path circuitry generates a downlink transmission grant using the DCI format being the fallback format to indicate a single-DRS port transmission scheme, and transmits the downlink transmission grant in a common or user equipment-specific search space of the CCE domain. The transmit path circuitry generates a downlink transmission grant using the DCI format being the dual-layer beamforming format to indicate a dual-DRS port transmission scheme or a single-DRS port transmission scheme, and transmits the downlink transmission grant in a user equipment-specific search space of the CCE domain.

A method of operating a base station is provided. The method comprising scrambling cyclic redundancy check (CRC) bits of a downlink control information (DCI) format using a cell radio network temporary identifier (C-RNTI) for dynamic scheduling, and scrambling the CRC bits of the DCI format using a semi-persistent scheduling (SPS) C-RNTI for semi-persistent scheduling.

If C-RNTI is used to scramble the CRC bits, the method includes generating a downlink transmission grant using the DCI format being a fallback format to indicate a transmit diversity transmission scheme or a single-layer beamforming scheme, and transmitting the downlink transmission grant in a common or user equipment-specific search space of a control channel (CCE) domain. The method also includes generating a downlink transmission grant using the DCI format being a dual-layer beamforming format to indicate a dual-dedicated reference signal (DRS) port transmission scheme or a single-DRS port transmission scheme, and transmitting the downlink transmission grant in a user equipment-specific search space of the CCE domain.

If SPS C-RNTI is used to scramble the CRC bits, the method includes generating a downlink transmission grant using the DCI format being the fallback format to indicate a single-DRS port transmission scheme, and transmitting the downlink transmission grant in a common or user equipment-specific search space of the CCE domain. The method also includes generating a downlink transmission grant using the DCI format being the dual-layer beamforming format to indicate a dual-DRS port transmission scheme or a single-DRS port transmission scheme, and transmitting the downlink transmission grant in a user equipment-specific search space of the CCE domain.

A subscriber station is provided. The subscriber station comprising a receive path circuitry configured to receive a downlink transmission grant from a base station. The receive path circuitry is also configured to de-scramble cyclic redundancy check (CRC) bits of the downlink transmission grant using a cell radio network temporary identifier (C-RNTI) key, and de-scramble the CRC bits of the downlink transmission grant using a semi-persistent scheduling (SPS) C-RNTI key.

If the C-RNTI key successfully de-scrambles the CRC bits, the receive path circuitry is configured to determine if the downlink transmission grant utilizes a downlink control information (DCI) format being a fallback format or a dual-layer beamforming format. If the downlink transmission grant utilizes a DCI format being the fallback format, the receive path circuitry is further configured to determine that a transmit diversity transmission scheme or a single-layer beamforming scheme is used by the base station. If the downlink transmission grant utilizes a DCI format being the dual-layer beamforming format, the receive path circuitry is further configured to determine that a dual-dedicated reference signal (DRS) port transmission scheme or a single-DRS port transmission scheme is used by the base station.

If the SPS C-RNTI key successfully de-scrambles the CRC bits, the receive path circuitry is configured to determine if the downlink transmission grant utilizes a DCI format being the fallback format or the dual-layer beamforming format. If the downlink transmission grant utilizes a DCI format being the fallback format, the receive path circuitry is further configured to determine that a single-DRS port transmission scheme is used by the base station. If the downlink transmission grant utilizes a DCI format being the dual-layer beamforming format, the receive path circuitry is further configured to determine that a dual-DRS port transmission scheme or a single-DRS port transmission scheme is used by the base station.

A method of operating a subscriber station. The method comprises receiving a downlink transmission grant from a base station. The method also includes de-scrambling cyclic redundancy check (CRC) bits of the downlink transmission grant using a cell radio network temporary identifier (C-RNTI) key, and de-scrambling the CRC bits of the downlink transmission grant using a semi-persistent scheduling (SPS) C-RNTI key.

If the C-RNTI key successfully de-scrambles the CRC bits, the method includes determining if the downlink transmission grant utilizes a downlink control information (DCI) format being a fallback format or a dual-layer beamforming format. If the downlink transmission grant utilizes a DCI format being the fallback format, the method further includes determining that a transmit diversity transmission scheme or a single-layer beamforming scheme is used by the base station. If the downlink transmission grant utilizes a DCI format being the dual-layer beamforming format, the method further includes determining that a dual-dedicated reference signal (DRS) port transmission scheme or a single-DRS port transmission scheme is used by the base station.

If the SPS C-RNTI key successfully de-scrambles the CRC bits, the method includes determining if the downlink transmission grant utilizes a DCI format being the fallback format or the dual-layer beamforming format. If the downlink transmission grant utilizes a DCI format being the fallback format, the method further includes determining that a single-DRS port transmission scheme is used by the base station. If the downlink transmission grant utilizes a DCI format being the dual-layer beamforming format, the method further includes determining that a dual-DRS port transmission scheme or a single-DRS port transmission scheme is used by the base station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a system for generating and mapping reference signal sequences according to an embodiment of this disclosure;

FIG. 10A illustrates a table summarizing downlink control information (DCI) formats used for downlink (DL) grants according to an embodiment of this disclosure;

FIG. 11 illustrates a table showing a mapping of enabled codewords to a stream index and a dedicated reference signal (DRS) index according to an embodiment of this disclosure;

FIG. 12 illustrates a table showing a mapping of a new data indicator (NDI) bit of a disabled codeword to a stream index and a dedicated reference signal (DRS) index according to an embodiment of this disclosure;

FIG. 15 illustrates a table depicting two states of a downlink (DL) grant according to an embodiment of this disclosure;

FIG. 16 illustrates a table depicting two states of a downlink (DL) grant using a one-bit field according to an embodiment of this disclosure;

FIG. 17 illustrates a table depicting use of the number of enabled transport blocks (TBs) to indicate the choice of cell-specific scrambling or UE-specific scrambling according to an embodiment of this disclosure;

FIG. 18 illustrates a table depicting use of an existing bit in a particular downlink (DL) grant to indicate the choice of cell-specific scrambling or UE-specific scrambling according to an embodiment of this disclosure;

FIG. 32 illustrates a table used to indicate a number of streams according to an embodiment of this disclosure;

FIG. 33 illustrates the use of a DRS set indicator flag to indicate a DRS RE set index according to an embodiment of this disclosure;

FIG. 34 illustrates a DCI format according to an embodiment of this disclosure;

FIG. 35 illustrates a DCI format according to another embodiment of this disclosure;

FIG. 38 illustrates a DCI format according to a further embodiment of this disclosure;

FIG. 39 illustrates a DCI format according to a yet another embodiment of this disclosure;

FIG. 40 illustrates a DCI format according to a yet further embodiment of this disclosure; and FIG. 41 illustrates a table used to map assigned DRSs or stream indices according to another embodiment of this disclosure.

DETAILED DESCRIPTION

FIGS. 1 through 41, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Also, the LTE term "user equipment" or "UE" is another term for "subscriber station" used below.

Figure 1:
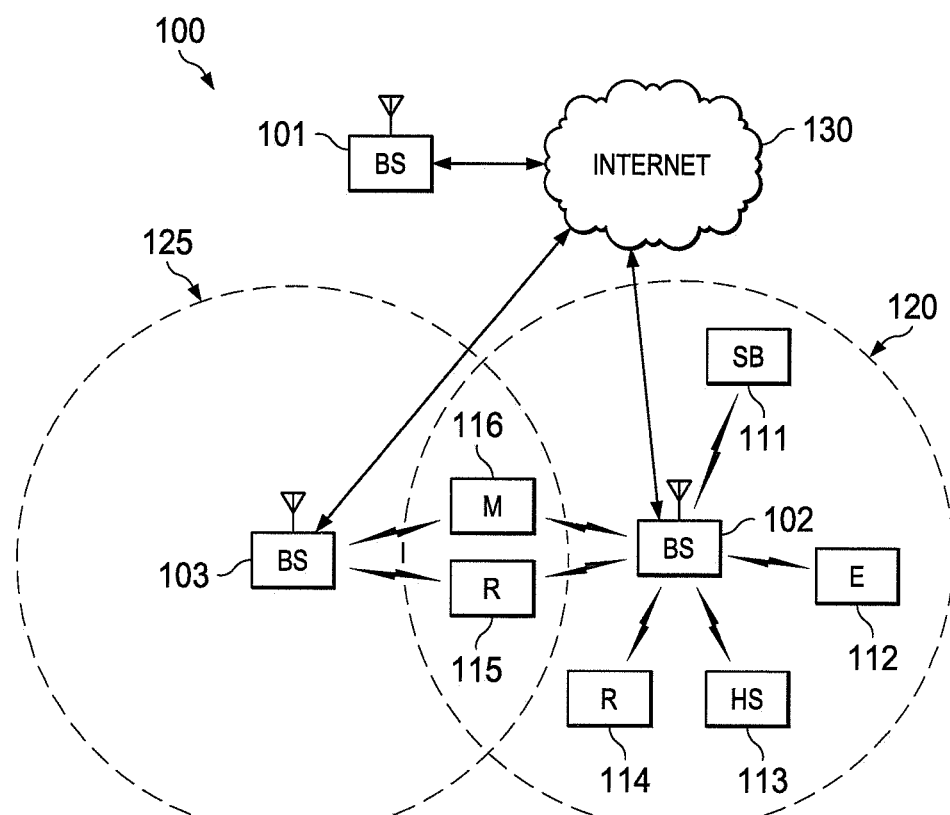
FIG. 1 illustrates an exemplary wireless network that transmits messages in the uplink according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
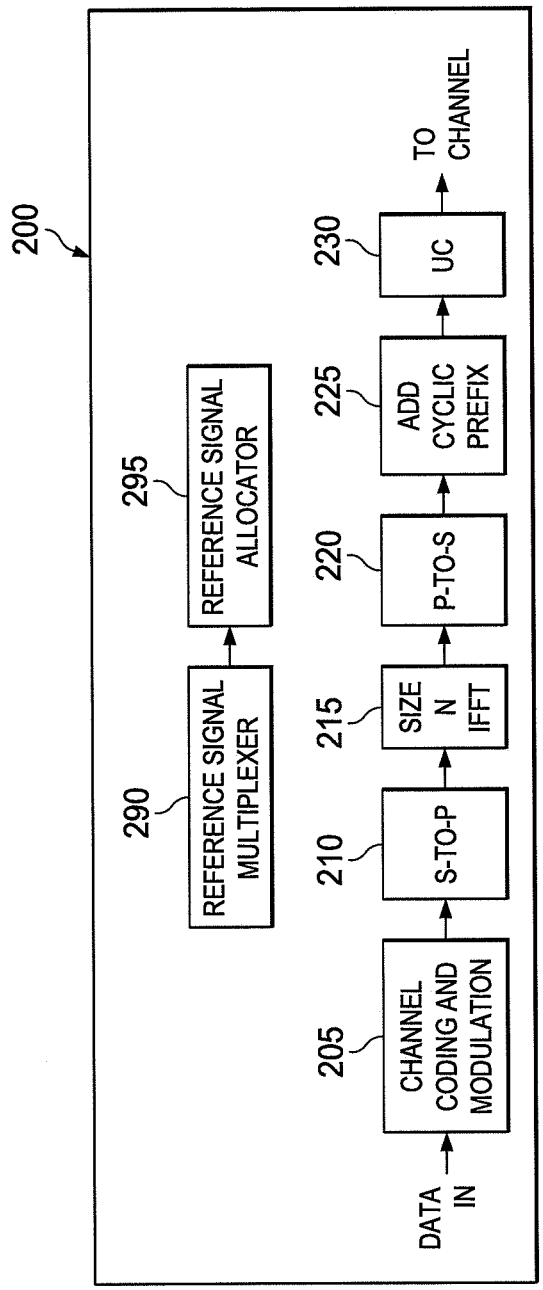
FIG. 2 is a high-level diagram of an orthogonal frequency division multiple access (OFDMA) transmitter according to one embodiment of the disclosure.
Figure 3:
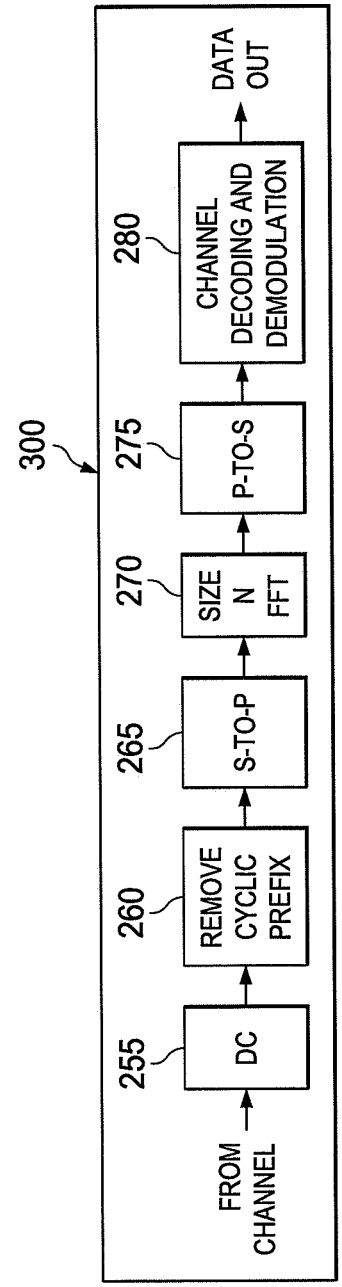
FIG. 3 is a high-level diagram of an OFDMA receiver according to one embodiment of the disclosure.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k, l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k, l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first a few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
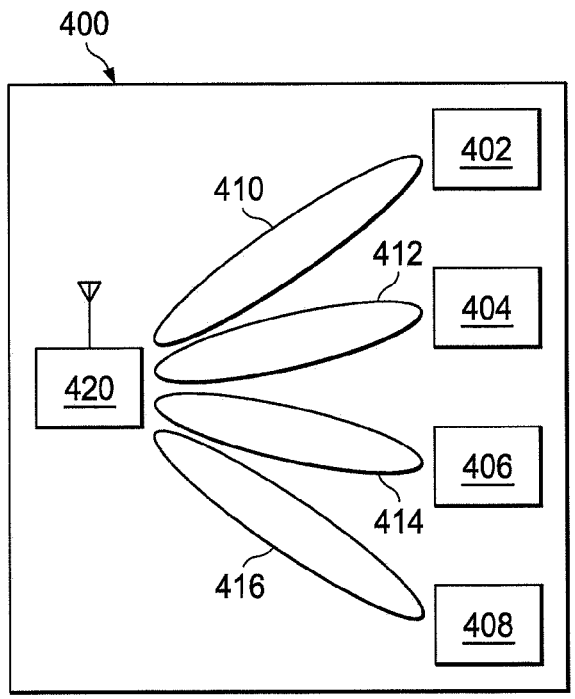
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to known as downlink communication and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
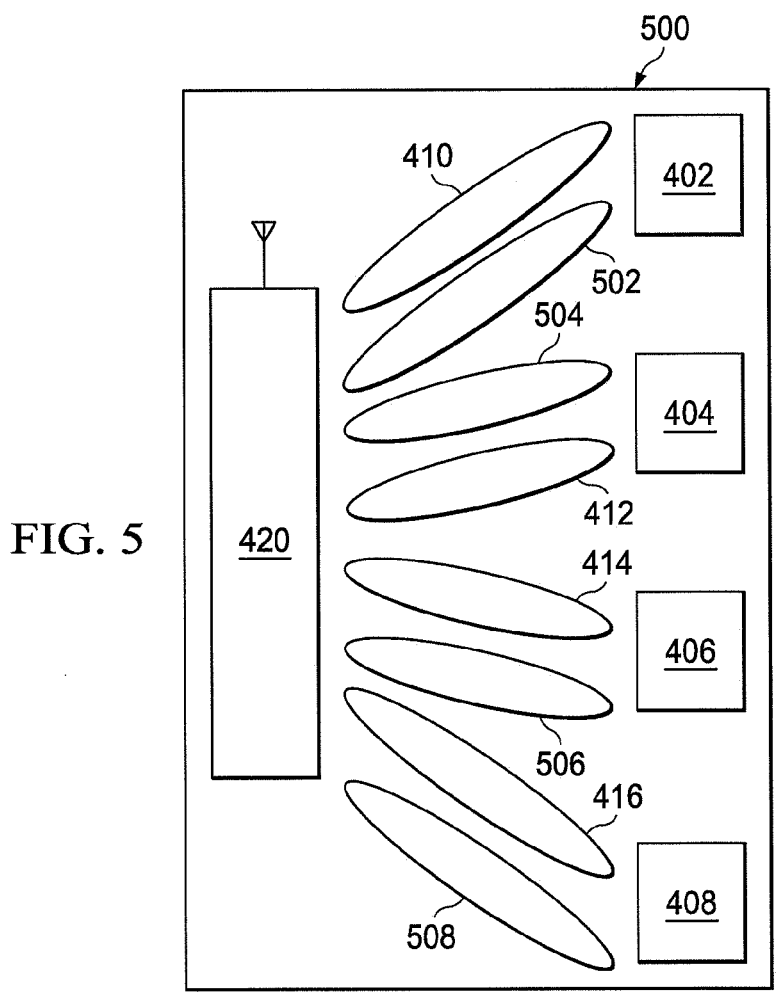
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

Closed-loop fixed codebook transmit beamforming has been employed in many wireless system such as WIMAX or 3GPP LTE. Descriptions of such systems can be found, for example, in 3GPP TS36.211 "Evolved Universal Terrestrial Radio Access (E-UTRA): Physical Channel and Modulation" and IEEE 802.16e "Part 16: Air Interface for Fixed and Mobile Broadband Wireless Access Systems". Both references are hereby incorporated by reference into this disclosure as if fully set forth herein. In a closed loop codebook beamforming system, a transmitter sends a pilot signal or channel sounding signal to a receiver, and the receiver measures the channel information and calculates the best codeword within a codebook that best matches the observed channel. The best codeword information is then fed back to the transmitter. The transmitter then uses the best codeword information for transmit antenna beamforming.

In some embodiments of this disclosure, downlink control information (DCI) format 1A is used for the compact scheduling of one PDSCH codeword and random access procedure initiated by a physical downlink control channel (PDCCH) order.

The following information is transmitted by means of the DCI format 1A:

Flag for format0/format1A differentiation—1 bit where value 0 indicates format 0 and value 1 indicates format 1A.

Format 1A is used for random access procedure initiated by a PDCCH order only if format 1A cyclic redundancy check (CRC) is scrambled with the cell radio network temporary identifier (C-RNTI), and all the remaining fields are set as follows:

localized/distributed virtual resource block (VRB) assignment flag—1 bit is set to '0';
resource block assignment—$\lceil \log_2(N_{RB}^{DL}(N_{RB}^{DL}+1))/2 \rceil$ bits, where all bits are set to 1;
preamble index—6 bits; and
physical random access channel (PRACH) mask index—4 bits.

All the remaining bits in format 1A for compact scheduling assignment of one PDSCH codeword are set to zeroes.

Otherwise:
Localized/distributed VRB assignment flag—1 bit as defined in Section 7.1.6.3 of 3GPP TS 36.213 v8.6.0, "E-UTRA, Physical Layer Procedures", March 2009, which is hereby incorporated by reference into the present application as if fully set forth herein.

Resource block assignment—$\lceil \log_2 (N_{RB}^{DL}(N_{RB}^{DL}+1))/2 \rceil$ bits as defined in Section 7.1.6.3 of 3GPP TS 36.213 v8.6.0, "E-UTRA, Physical Layer Procedures", March 2009, which is hereby incorporated by reference into the present application as if fully set forth herein;

for localized VRB, $\lceil \log_2(N_{RB}^{DL}(N_{RB}^{DL}+1))/2 \rceil$ bits provide the resource allocation;

for distributed VRB,
if $N_{RB}^{DL} < 50$ or if the format 1A CRC is scrambled by the random access radio network temporary identifier (RA-RNTI), the paging radio network temporary identifier (P-RNTI), or the system information radio network temporary identifier (SI-RNTI), $\lceil \log_2 (N_{RB}^{DL}(N_{RB}^{DL}+1))/2 \rceil$ bits provide the resource allocation.

else
−1 bit, the most significant bit (MSB) indicates the gap value, where value 0 indicates $N_{gap}=N_{gap,1}$ and value 1 indicates $N_{gap}=N_{gap,2}$; and
($\lceil \log_2(N_{RB}^{DL}(N_{RB}^{DL}+1))/2 \rceil -1$) bits provide the resource allocation.

Modulation and coding scheme (MCS)—5 bits as defined in Section 7.1.7 of 3GPP TS 36.213 v8.6.0, "E-UTRA, Physical Layer Procedures", March 2009, which is hereby incorporated by reference into the present application as if fully set forth herein.

Hybrid automatic repeat request (HARQ) process number—3 bits for frequency division duplexing (FDD), 4 bits for time division duplexing (TDD).

New data indicator (NDI)—1 bit.

If the format 1A CRC is scrambled by RA-RNTI, P-RNTI, or SI-RNTI:
if $N_{RB}^{DL} \geq 50$ and the localized/distributed VRB assignment flag is set to 1:
the new data indicator bit indicates the gap value, where value 0 indicates $N_{gap}=N_{gap,1}$ and value 1 indicates $N_{gap}=N_{gap,2}$,
else the new data indicator bit is reserved.

else
the new data indicator bit.

Redundancy version—2 bits.

Transport power control (TPC) command for physical uplink control channel (PUCCH)—2 bits as defined in Section 5.1.2.1 of 3GPP TS 36.213 v8.6.0, "E-UTRA, Physical Layer Procedures", March 2009, which is hereby incorporated by reference into the present application as if fully set forth herein.

If the format 1A CRC is scrambled by RA-RNTI, P-RNTI, or SI-RNTI:
the most significant bit of the TPC command is reserved.
the least significant bit of the TPC command indicates column $N_{RB}^{1A}$ of the transport block size (TBS) table defined in 3GPP TS 36.213 v8.6.0, "E-UTRA, Physical Layer Procedures", March 2009, which is hereby incorporated by reference into the present application as if fully set forth herein.
if least significant bit is 0, then $N_{RB}^{1A}=2$ else $N_{RB}^{1A}=3$.

Else
the two bits including the most significant bit indicates the TPC command.
Downlink assignment index (this field is present in TDD for all the uplink—downlink configurations. This field is not present in FDD)—2 bits.

If the number of information bits in format 1A is less than that of format 0, zeros are appended to format 1A until the payload size equals that of format 0.

If the number of information bits in format 1A belongs to one of the sizes in Table 5.3.3.1.2-1 of 3GPP TS 36.213 v8.6.0, "E-UTRA, Physical Layer Procedures", March 2009, which is hereby incorporated by reference into the present application as if fully set forth herein, one zero bit is appended to format 1A.

When the format 1A CRC is scrambled with an RA-RNTI, P-RNTI, or SI-RNTI, then the following fields among the fields above are reserved:
HARQ process number; and
Downlink Assignment Index (used for TDD only and is not present in FDD).

In other embodiments, the DCI format 2A is defined for downlink open-loop spatial multiplexing in Section 5.3.3.1.5A of 3GPP TS 36.212 v 8.6.0, "E-UTRA, Multiplexing and Channel Coding", March 2009, which is hereby incorporated by reference into the present application as if fully set forth herein.

The following information is transmitted by means of the DCI format 2A:
Resource allocation header (resource allocation type 0/type 1)—1 bit as defined in Section 7.1.6 of 3GPP TS 36.213 v8.6.0, "E-UTRA, Physical Layer Procedures", March 2009, which is hereby incorporated by reference into the present application as if fully set forth herein.

If downlink bandwidth is less than or equal to 10 physical resource blocks (PRBs), there is no resource allocation header and resource allocation type 0 is assumed.

Resource block assignment:
for resource allocation type 0 as defined in Section 7.1.6.1 of 3GPP TS 36.213 v8.6.0, "E-UTRA, Physical Layer Procedures", March 2009, which is hereby incorporated by reference into the present application as if fully set forth herein, $\lceil N_{RB}^{DL}/P \rceil$ bits provide the resource allocation.

For resource allocation type 1 as defined in Section 7.1.6.2 of 3GPP TS 36.213 v8.6.0, "E-UTRA, Physical Layer Procedures", March 2009, which is hereby incorporated by reference into the present application as if fully set forth herein, $\lceil N_{RB}^{DL}/P \rceil$ bits of this field are used as a header specific to this resource allocation type to indicate the selected resource blocks subset.

1 bit indicates a shift of the resource allocation span.
($\lceil N_{RB}^{DL}/P \rceil - \lceil N_{RB}^{DL}/P-1 \rceil$) bits provide the resource allocation.

The value of P depends on the number of DL resource blocks as indicated in subclause [7.1.6.1] of 3GPP TS 36.213 v8.6.0, "E-UTRA, Physical Layer Procedures", March 2009, which is hereby incorporated by reference into the present application as if fully set forth herein.

TPC command for PUCCH—2 bits as defined in Section 5.1.2.1 of 3GPP TS 36.213 v8.6.0, "E-UTRA, Physical Layer Procedures", March 2009, which is hereby incorporated by reference into the present application as if fully set forth herein.

Downlink Assignment Index (this field is present in TDD for all the uplink-downlink configurations. This field is not present in FDD)—2 bits.

HARQ process number—3 bits (FDD), 4 bits (TDD).

Transport block to codeword swap flag—1 bit.

In addition, for transport block 1:

Modulation and coding scheme—5 bits as defined in Section 7.1.7 of 3GPP TS 36.213 v8.6.0, "E-UTRA, Physical Layer Procedures", March 2009, which is hereby incorporated by reference into the present application as if fully set forth herein.

New data indicator—1 bit.

Redundancy version—2 bits.

In addition, for transport block 2:

Modulation and coding scheme—5 bits as defined in Section 7.1.7 of 3GPP TS 36.213 v8.6.0, "E-UTRA, Physical Layer Procedures", March 2009, which is hereby incorporated by reference into the present application as if fully set forth herein.

New data indicator—1 bit.

Redundancy version—2 bits.

Precoding information—number of bits as specified in Table 5.3.3.1.5A-1 of 3GPP TS 36.212 v 8.6.0, "E-UTRA, Multiplexing and Channel Coding", March 2009, which is hereby incorporated by reference into the present application as if fully set forth herein.

If both transport blocks are enabled, the transport block to codeword mapping is specified according to Table 5.3.3.1.5-1 of 3GPP TS 36.212 v 8.6.0, "E-UTRA, Multiplexing and Channel Coding", March 2009, which is hereby incorporated by reference into the present application as if fully set forth herein.

If one of the transport blocks is disabled, the transport block to codeword swap flag is reserved, and the transport block to codeword mapping is specified according to Table 5.3.3.1.5-2 of 3GPP TS 36.212 v 8.6.0, "E-UTRA, Multiplexing and Channel Coding", March 2009, which is hereby incorporated by reference into the present application as if fully set forth herein.

The precoding information field is defined according to Table 5.3.3.1.5A-2 of 3GPP TS 36.212 v 8.6.0, "E-UTRA, Multiplexing and Channel Coding", March 2009, which is hereby incorporated by reference into the present application as if fully set forth herein. For a single enabled codeword, index 1 in Table 5.3.3.1.5A-2 is only supported for retransmission of the corresponding transport block if that transport block has previously been transmitted using two layers with open-loop spatial multiplexing.

For transmission with 2 antenna ports, the precoding information field is not present. The number of transmission layers is equal to 2 if both codewords are enabled. Transmit diversity is used if codeword 0 is enabled while codeword 1 is disabled.

If the number of information bits in format 2A belongs to one of the sizes in Table 5.3.3.1.2-1, one zero bit is appended to format 2A.

Modulation order determination is defined for spatial multiplexing in Section 7.1.7.1 of 3GPP TS 36.213 v8.6.0, "E-UTRA, Physical Layer Procedures", March 2009, which is hereby incorporated by reference into the present application as if fully set forth herein.

In particular embodiments, the UE uses $Q_m=2$ if the DCI CRC is scrambled by P-RNTI, RA-RNTI, or SI-RNTI. Otherwise, the UE uses $I_{MCS}$ and Table 7.1.7.1-1 to determine the modulation order ($Q_m$) used in the physical downlink shared channel.

If the DCI CRC is scrambled by P-RNTI, RA-RNTI, or SI-RNTI then for DCI format 1A:

the UE sets the TBS index ($I_{TBS}$) equal to $I_{MCS}$ and determine the TBS by the procedure in Section 7.1.7.2.1 of 3GPP TS 36.213 v8.6.0, "E-UTRA, Physical Layer Procedures", March 2009, which is hereby incorporated by reference into the present application as if fully set forth herein.

for DCI format 1C:

the UE sets the TBS index ($I_{TBS}$) equal to $I_{MCS}$ and determine the TBS from Table 7.1.7.2.3-1 of 3GPP TS 36.213 v8.6.0, "E-UTRA, Physical Layer Procedures", March 2009, which is hereby incorporated by reference into the present application as if fully set forth herein.

Else for $0 \leq I_{MCS} \leq 28$, the UE first determines the TBS index ($I_{TBS}$) using $I_{MCS}$ and Table 7.1.7.1-1 of 3GPP TS 36.213 v8.6.0, "E-UTRA, Physical Layer Procedures", March 2009, which is hereby incorporated by reference into the present application as if fully set forth herein, except if the transport block is disabled in DCI formats 2 and 2A as specified below. For a transport block that is not mapped to two-layer spatial multiplexing, the TBS is determined by the procedure in Section 7.1.7.2.1 of 3GPP TS 36.213 v8.6.0, "E-UTRA, Physical Layer Procedures", March 2009, which is hereby incorporated by reference into the present application as if fully set forth herein. For a transport block that is mapped to two-layer spatial multiplexing, the TBS is determined by the procedure in Section 7.1.7.2.2 of 3GPP TS 36.213 v8.6.0, "E-UTRA, Physical Layer Procedures", March 2009, which is hereby incorporated by reference into the present application as if fully set forth herein.

for $29 \leq I_{MCS} \leq 31$, the TBS is assumed to be as determined from DCI transported in the latest PDCCH for the same transport block using $0 \leq I_{MCS} \leq 28$.

In DCI formats 2 and 2A, a transport block is disabled if $I_{MCS}=0$ and if rvidx=1. Otherwise the transport block is enabled.

The NDI and HARQ process ID, as signalled on PDCCH, and the TBS, as determined above, are delivered to higher layers.

Demodulation reference signals (DMRSs) are provided for each UE's demodulation. In some cases, the DMRS can be a dedicated RS (DRS) to each UE, implying the RS provided to one UE cannot be utilized by the other UEs scheduled in different frequency bands in the same subframe, or in adjacent subframes in the same frequency band. In the case of multi-antenna transmissions, a number of DRSs are provided for the demodulation of the number of multiple data streams, and each DRS is sometimes precoded with the same precoder used for the data stream.

Figure 6A:
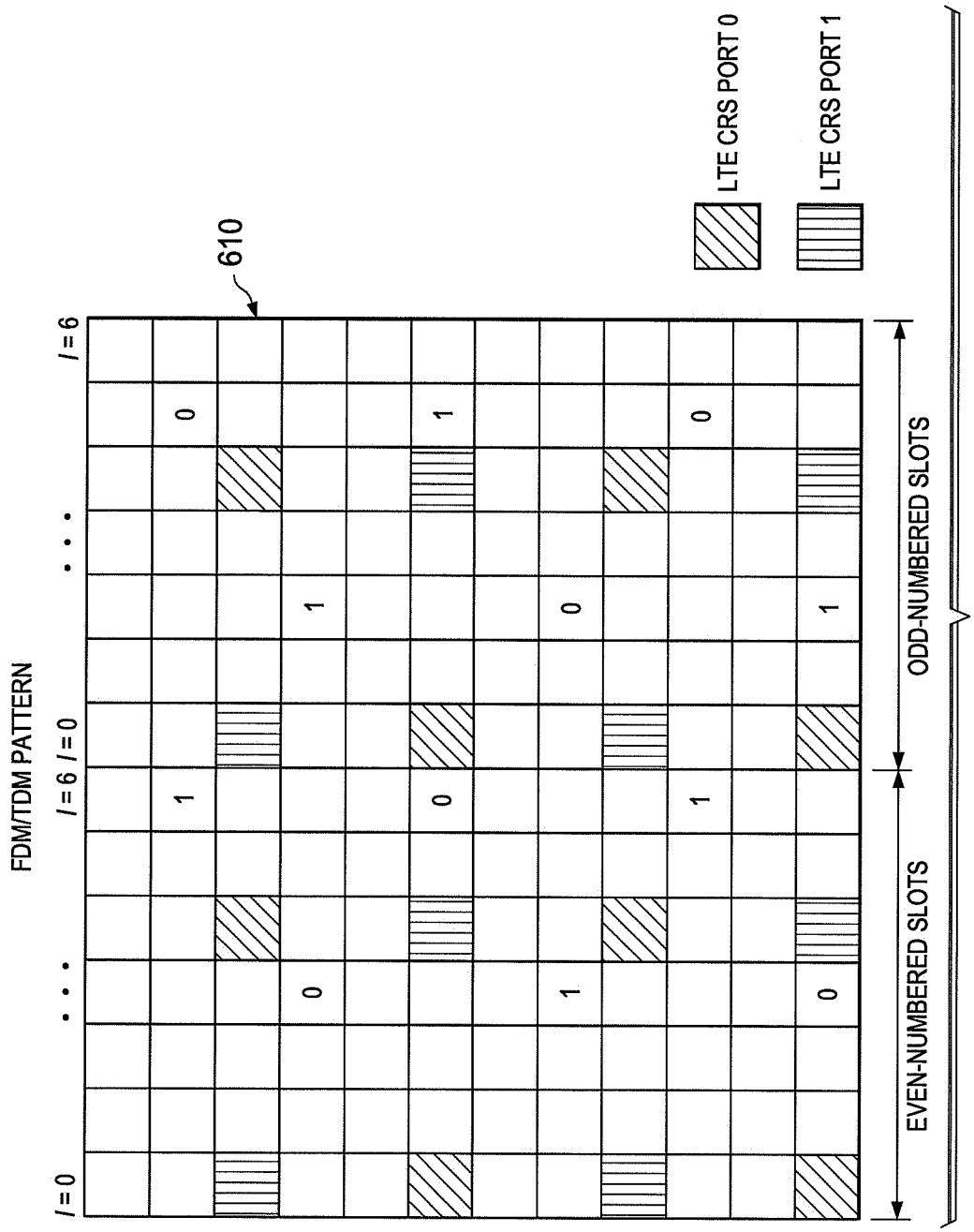
FIGS. 6A and 6B illustrate reference signal patterns according to an embodiment of this disclosure.
Figure 6B:
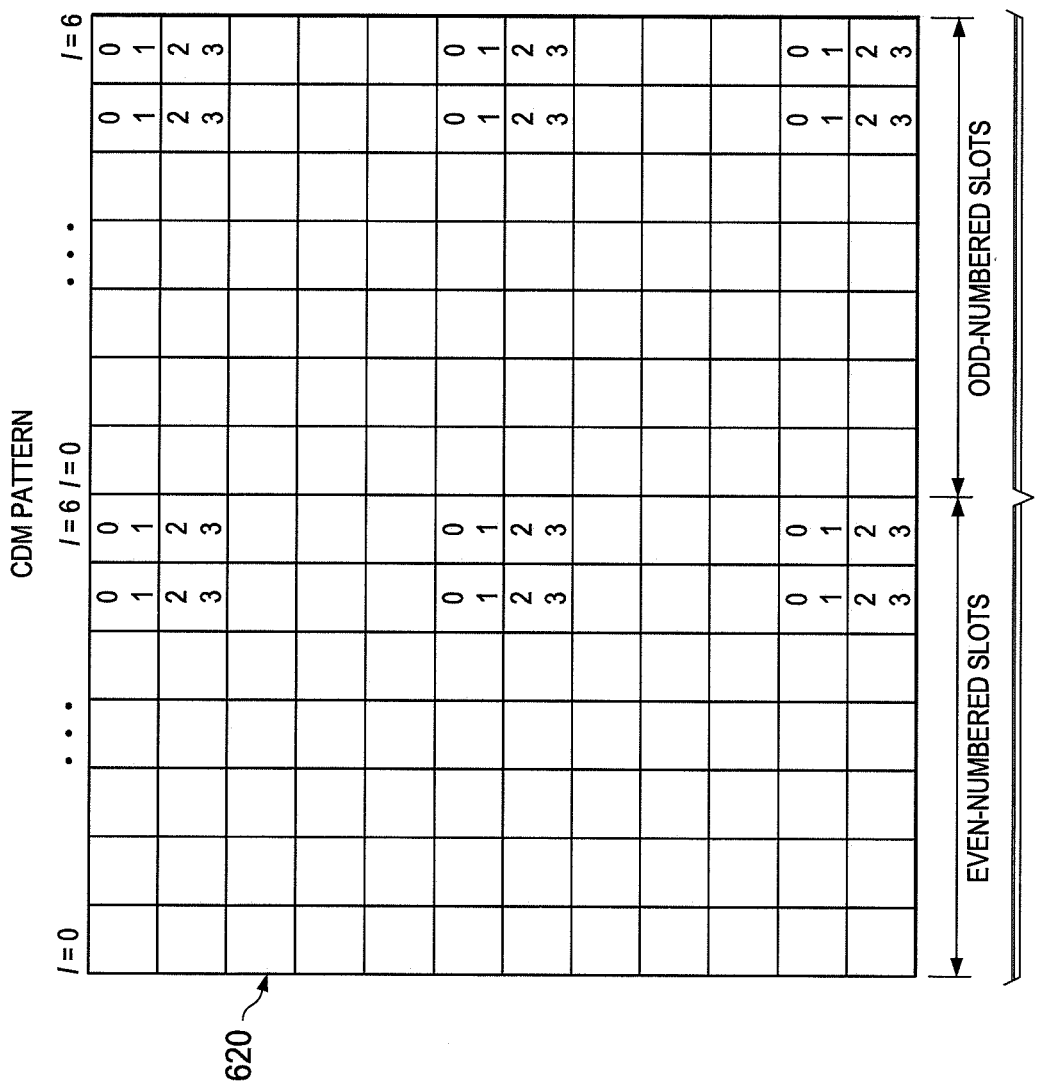

FIGS. 6A and 6B illustrate reference signal patterns according to an embodiment of this disclosure.

FIGS. 6A and 6B illustrate a 2-DRS pattern 610 and a 4-DRS pattern 620. Reference signal pattern 610 is an FDM/TDM pilot pattern that can support up to 2 layer transmissions. In reference pattern 610, the DRS REs are partitioned into two groups, the REs labeled with 0 and those with 1. The DRS REs labeled with 0 carry the DRS for layer 0, while the DRS REs labeled with 1 carry the DRS for layer 1.

Reference signal pattern 620 is a CDM/FDM pilot pattern that can support up to four layer transmissions, where DRS REs are again partitioned into two groups, those labeled with 0,1 and those with 2,3. For example, the DRS REs labeled with 0,1 carry the DRS for layers 0 and 1 where the two layers' RSs are code-division multiplexed (CDMed). In the two adjacent DRS REs labeled with 0,1, a DRS symbol r0 for layer 0 is mapped to the two REs spread by a Walsh code [1 1] that results in [r0 r0], while a DRS symbol r1 for layer 1 is mapped to the two REs spread by a Walsh code [1 −1] that results in [r1 −r1].

In one embodiment, it is assumed that a first UE and a second UE are scheduled in a subframe.

In one MU-MIMO transmission mode, for the first UE, i_DRS=0 meaning that the first DRS pattern, DRS(0), is used for this UE.

For the second UE, i_DRS=1 meaning that the second DRS pattern, DRS(1), is used for this UE.

Figure 7:
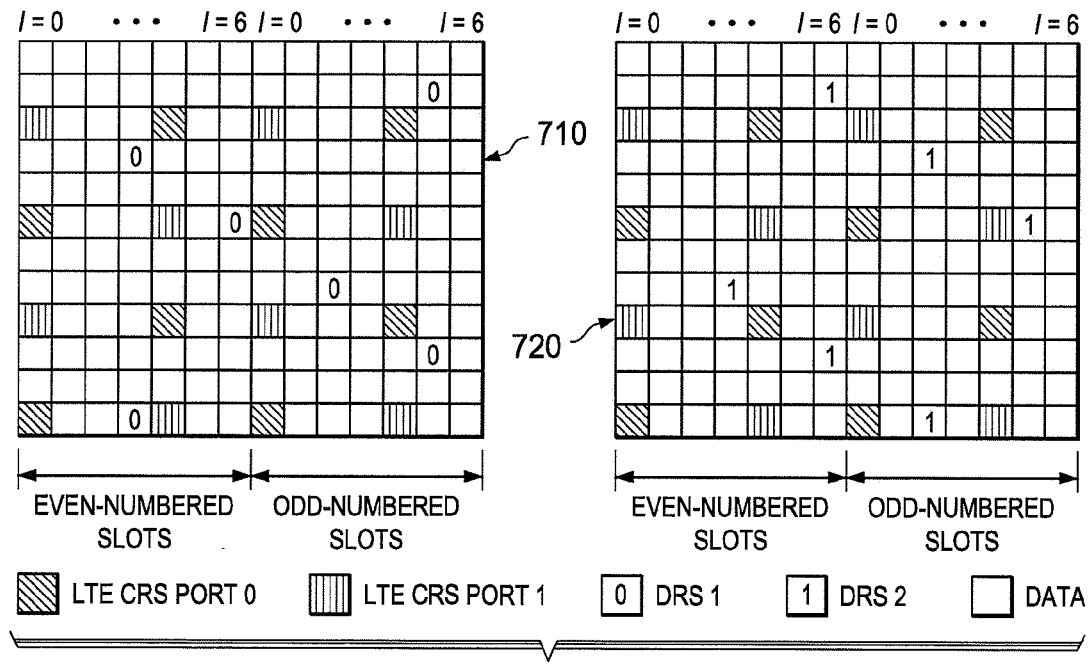
FIG. 7 illustrates data sections and reference signal sections of a reference pattern from the perspective of two user equipments according to an embodiment of this disclosure.

FIG. 7 illustrates data sections and reference signal sections of the reference pattern 610 from the perspective of two user equipments according to an embodiment of this disclosure.

FIG. 7 illustrates the behavior/observation of the first and second UEs on the data section and the DRS section of the reference pattern 610. As shown in reference signal pattern 710, the first UE only sees DRS(0) as the pilot RE, and the other REs (other than CRS and DRS(0)) are seen by the first UE as data REs. On the other hand, as seen in reference signal pattern 720, the second UE only sees DRS(1) as the pilot RE, and other REs (other than CRS and DRS(1)) are seen by the second as data REs.

Figure 8:
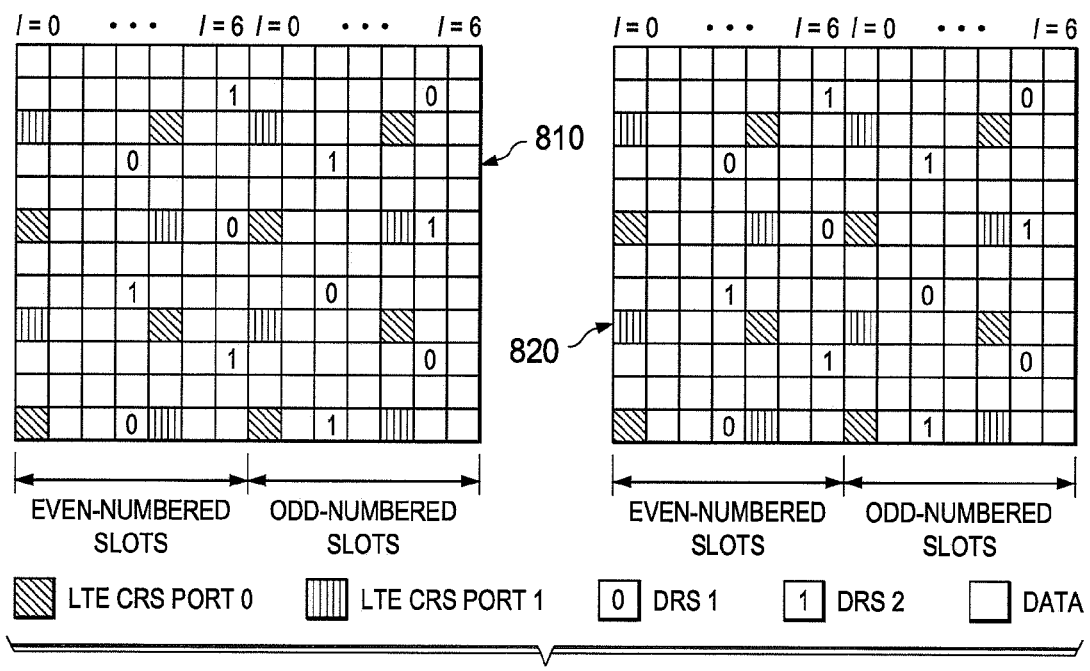
FIG. 8 illustrates data sections and reference signal sections of a reference pattern from the perspective of two user equipments according to another embodiment of this disclosure.

FIG. 8 illustrates data sections and reference signal sections of the reference pattern 610 from the perspective of two user equipments according to another embodiment of this disclosure.

In another MU-MIMO mode, for the first UE, N_DRS=2 and i_DRS=0 meaning that the first DRS pattern, DRS(0), is used for this UE. For the second UE, N_DRS=2 and i_DRS=1 meaning that the second DRS pattern, DRS(1), is used for this UE.

With these assumptions, FIG. 8 illustrates each UE's observation on the data section and the DRS section of the reference pattern 610 according to another embodiment of this disclosure. As shown in reference signal pattern 810, the first UE only sees DRS(0) as the pilot RE, and the REs (other than CRS DRS(0), and DRS(1)) are seen by the first UE as data REs. On the other hand, as seen in reference signal pattern 820, the second UE only sees DRS(1) as the pilot RE, and the REs (other than CRS, DRS(0), DRS(1)) are seen by the second UE as data REs.

When multiple UEs are co-scheduled in the same frequency band, a first number of streams are transmitted to the first UE, and a second number of streams are transmitted to the second UE. There are at least two possible ways for the eNodeB to provide each UE's DRS in this multi-user MIMO transmission.

In a first MU-MIMO method, the eNodeB provides orthogonal sets of DRS to the UEs, where the first and the second UE would receive the first and the second number of orthogonal DRSs. All the first number and the second number of DRSs are orthogonally multiplexed, e.g., by FDM/TDM or CDM. Furthermore, the first and the second UEs would know that there could be another UE co-scheduled in the same time-frequency resource.

In a second MU-MIMO method, the eNodeB provides the first and the second number of DRSs to the first and the second UE. In this method, the first number and the second number of DRSs may not be orthogonally multiplexed. Furthermore, the first and the second UEs may not be able to know that there could be another UE co-scheduled in the same time-frequency resource.

In one example, the first and the second UE are co-scheduled in the same frequency band by an eNodeB, where the first UE would receive stream 0, while the second UE would receive stream 1.

Using the first MU-MIMO method, the first UE would receive DRS 0 together with stream 0, while the second UE would receive DRS 1 together with stream 1. FIGS. 6A and 6B may be referred to for specific DRS patterns with FDM/TDM and with CDM. For example, in the FDM reference signal pattern 610, the first UE would receive the DRS in the RS REs with label 0, while the second UE would receive the DRS in the RS REs with label 1. If the first UE were to know that another UE is co-scheduled in the time-frequency resource where the first UE receives the downlink transmission, the first UE may try to estimate interfering channels in the other DRS REs (i.e., the RS REs with label 1) and use the interference information for demodulation.

Using the second MU-MIMO method, the first and second UEs' DRSs are not necessarily orthogonally multiplexed, and each UE assumes that there are no co-scheduled UEs in the time-frequency resource where the UEs receive the downlink transmission. In other words, in this MU-MIMO mode, the UEs expect SU-MIMO transmissions from the eNodeB. In one example, both the first and the second UEs would receive DRS in the same set of RS REs (e.g., RS REs with label 0 in FIGS. 6A and 6B).

For single-user transmissions in a time-frequency resource of an eNodeB's cell, RS scrambling can be used to make inter-cell interference independent of the desired RS signal to a UE. In each downlink transmission, a UE receives a distorted RS signal that is a superposition of the desired RS signal, the interfering RS signal from other cells, and the noise. With the RS scrambling sequence being cell-specific, the inter-cell interference seen by a UE becomes independent of the desired RS signal, which facilitates channel estimation.

In the case of multi-user transmissions, more consideration of the DRS scrambling is needed to facilitate the channel and the intra-cell interference estimation. There are two ways of DRS scrambling. With a UE-specific scrambling method, DRS 0 and DRS 1 are scrambled in a UE-specific way. With a cell-specific scrambling method, DRS 0 and DRS 1 are scrambled in a cell-specific way.

In one embodiment, the DRSs are scrambled using UE-specific scrambling method and the first MU-MIMO method is used. Two UEs would have two orthogonal sets of resources (DRS REs) for the two sets of DRSs. In this case, even if the second UE were to know the RS REs for the first UE's DRS, the second UE may not know the scrambling sequence used for the DRS for the first UE's stream since the second UE does not know the first UE's id. In such a case, the second UE may not be able to estimate the interfering channels. On the other hand, when the second MU-MIMO method is used, the two UEs may receive their DRSs in the same set of DRS REs. In the set of DRS REs, the second UE would receive a distorted RS signal that is a superposition of the desired RS signal, the interfering RS signal intended for the second UE, and the noise. When the scrambling sequence is UE-specific, the interfering RS signal is independent of the desired RS signal to the second UE. This enables the second UE to measure its channel separately from the interfering channel intended for the first UE.

In another embodiment, the DRSs are scrambled using a cell-specific scrambling method, and the first MU-MIMO method is used. Two UEs would have two orthogonal sets of resources (DRS REs) for the two sets of DRSs. In this case, if the second UE knows of the RS REs for the first UE's DRS, the second UE would know of the scrambling sequence used for the DRS for the first UE's stream since the DRS is cell-specific. In this case, the second UE may be able to estimate the interfering channels carried in the DRS REs with label 0. On the other hand, when the second MU-MIMO method is used, two UEs may receive their DRSs in the same set of DRS REs. In the set of DRS REs, the second UE would receive a distorted RS signal that is a superposition of the desired RS signal, the interfering RS signal intended for the second UE, and the noise. When the scrambling sequence is cell-specific, the interfering RS signal is aligned with the desired RS signal to the second UE. In this case, the second UE can only measure the superimposed channel of the interfering channel and the desired channel, which could degrade the demodulation performance.

Accordingly, one scrambling method cannot universally provide good channel estimation and demodulation performance in both MU-MIMO scenarios. Thus, this disclosure provides a system and method for a wireless communication system to adapt a scrambling method based at least partly upon the MU-MIMO mode.

In some embodiments, the UE-specific scrambling method has an initialization seed for each DRS, and the initialization seed is dependent on the UE-id or RNTI number. The initialization seed may or may not be dependent on the antenna port id or the cell-id.

In one particular embodiment, the initialization seed is determined using Equation 1 below:

$$c_{init} = (\lfloor n_s/2 \rfloor + 1) \cdot (2N_{ID}^{cell} + 1) \cdot 2^{16} + n_{RNTI},\qquad\text{[Eqn. 1]}$$

where $n_s$ is the slot id, $N_{ID}^{cell}$ is the cell id, and $n_{RNTI}$ is the UE-id or the RNTI number.

In another particular embodiment, the initialization seed is determined using Equation 2 below:

$$c_{init} = (g+z+1)(\lfloor n_s/2 \rfloor + 1) \cdot (2N_{ID}^{cell} + 1) \cdot 2^{16} + n_{RNTI},\qquad\text{[Eqn. 2]}$$

where g is an antenna port number (e.g., 0 or 1 when there are two antenna ports) and z is an integer (e.g., 0 or 1).

In yet another particular embodiment, the initialization seed is determined using Equation 3 below:

$$c_{init} = (\lfloor n_s/2 \rfloor + g + z + 1) \cdot (2N_{ID}^{cell} + 1) \cdot 2^{16} + n_{RNTI},\qquad\text{[Eqn. 3]}$$

where g is an antenna port number.

In other embodiments, the cell-specific scrambling method has an initialization seed for each DRS, and the initialization seed is dependent on the cell-id. The initialization seed may or may not be dependent on the antenna port id or the UE-id or RNTI.

In a particular embodiment, the initialization seed is determined using Equation 4 below:

$$c_{init} = (\lfloor n_s/2 \rfloor + 1) \cdot (2N_{ID}^{cell} + 1) \cdot 2^{16},\qquad\text{[Eqn. 4]}$$

where $n_s$ is the slot id, $N_{ID}^{cell}$ is the cell id, and $n_{RNTI}$ is the UE-id or the RNTI number.

In another particular embodiment, the initialization seed is determined using Equation 5 below:

$$c_{init} = (g+1)(\lfloor n_s/2 \rfloor + 1) \cdot (2N_{ID}^{cell} + 1) \cdot 2^{16},\qquad\text{[Eqn. 5]}$$

where g is an antenna port number, e.g., 0 or 1 when there are two antenna ports.

In yet another particular embodiment, the initialization seed is determined using Equation 6 below:

$$c_{init} = (\lfloor n_s/2 \rfloor g + 1) \cdot (2N_{ID}^{cell} + 1) \cdot 2^{16},\qquad\text{[Eqn. 5]}$$

where g is an antenna port number.

Once the scrambling sequence is initialized, the scrambling sequences are generated, for example, according to the methods and systems described in U.S. Non-provisional patent application Ser. No. 12/749,340, filed Mar. 29, 2010, entitled "METHOD AND SYSTEM FOR MULTI-LAYER BEAMFORMING", which is hereby incorporated by reference into the present application as if fully set forth herein.

FIG. 9 illustrates a system for generating and mapping reference signal sequences according to an embodiment of this disclosure.

As shown in FIG. 9, system 900 generates a plurality of RS sequences and maps the generated RS sequences onto a number of antenna ports in two steps. The generated RS sequences can be mapped onto either cell-specific antenna ports or UE-specific (or dedicated) antenna ports.

The RS sequence generator 901 receives an initialization seed $c_{init,g}$ for generating a pseudo-random sequence $c_g(i)$. The RS sequence generator 901 then uses the pseudo-random sequence $c_g(i)$ to generate a respective RS sequence for each of the antenna ports and sends each RS sequence to a respective resource element mapper 903-1 to 903-n for each of the antenna ports.

FIG. 10A illustrates a table 1000 summarizing downlink control information (DCI) formats used for downlink (DL) grants according to an embodiment of this disclosure.

For supporting MU-MIMO, an eNodeB may determine a transmission mode for UEs by higher-layer signaling. In a transmission mode, an eNodeB may schedule multiple types of downlink transmissions, e.g., one for normal transmission, another for fallback transmission, and so forth. For different types of transmissions, an eNodeB transmits different downlink control information (DCI) formats for the downlink (DL) grants.

As shown in table 1000, normal transmission mode is scheduled by DCI format 2A', regardless of whether the transmission is configured by C-RNTI or semi-persistent scheduling (SPS) C-RNTI. In this embodiment, please note that 2A' refers to a slightly modified version of format 2A. In normal transmission mode, a UE can receive up to two streams and up to two DRSs associated with the two streams, and an eNodeB can schedule up to two data streams and up to two DRSs to a number of UEs in a unit of time-frequency resource. UEs in normal transmission mode are aware that the DRS REs for the two DRSs do not carry data symbols for themselves. On the other hand, fallback modes are scheduled by DCI format 1A. When a DL transmission is configured by C-RNTI, the fallback transmission is a transmit diversity or a single-layer beamforming scheme. When a DL transmission is configured by SPS C-RNTI, the fallback transmission is single layer beamforming, where the DRS port index is signaled semi-statically in the upper layer other than the PHY layer. An eNodeB may schedule up to two UEs with different DRS port indices assigned by the higher layer in the same time frequency resource by transmitting up to two DCI format 1A to up to two UEs.

When the DRS port is assigned semi-statically, various methods may be used as described in this disclosure. For example, the UE id may be associated with the DRS port assigned, or UEs with an even UE id would have DRS port 0, while UEs with an odd UE id would have DRS port 1.

As indicated by table 1000, a base station scrambles the cyclic redundancy check (CRC) bits of a downlink control information (DCI) format using a cell radio network temporary identifier (C-RNTI) for dynamic scheduling, and scrambles the CRC bits of the DCI format using a semi-persistent scheduling (SPS) C-RNTI for semi-persistent scheduling.

If C-RNTI is used to scramble the CRC bits, the base station generates a downlink transmission grant using the DCI format being a fallback format to indicate a transmit diversity transmission scheme or a single-layer beamforming scheme, and transmits the downlink transmission grant in a common or user equipment-specific search space of a control channel (CCE) domain. The base station also generates a downlink transmission grant using the DCI format being a dual-layer beamforming format to indicate a dual-dedicated reference signal (DRS) port transmission scheme or a single-DRS port transmission scheme, and transmits the downlink transmission grant in a user equipment-specific search space of the CCE domain.

If SPS C-RNTI is used to scramble the CRC bits, the base station generates a downlink transmission grant using the DCI format being the fallback format to indicate a single-DRS port transmission scheme, and transmits the downlink transmission grant in a common or user equipment-specific search space of the CCE domain. The base station generates a downlink transmission grant using the DCI format being the dual-layer beamforming format to indicate a dual-DRS port transmission scheme or a single-DRS port transmission scheme, and transmits the downlink transmission grant in a user equipment-specific search space of the CCE domain.

Figure 10B:
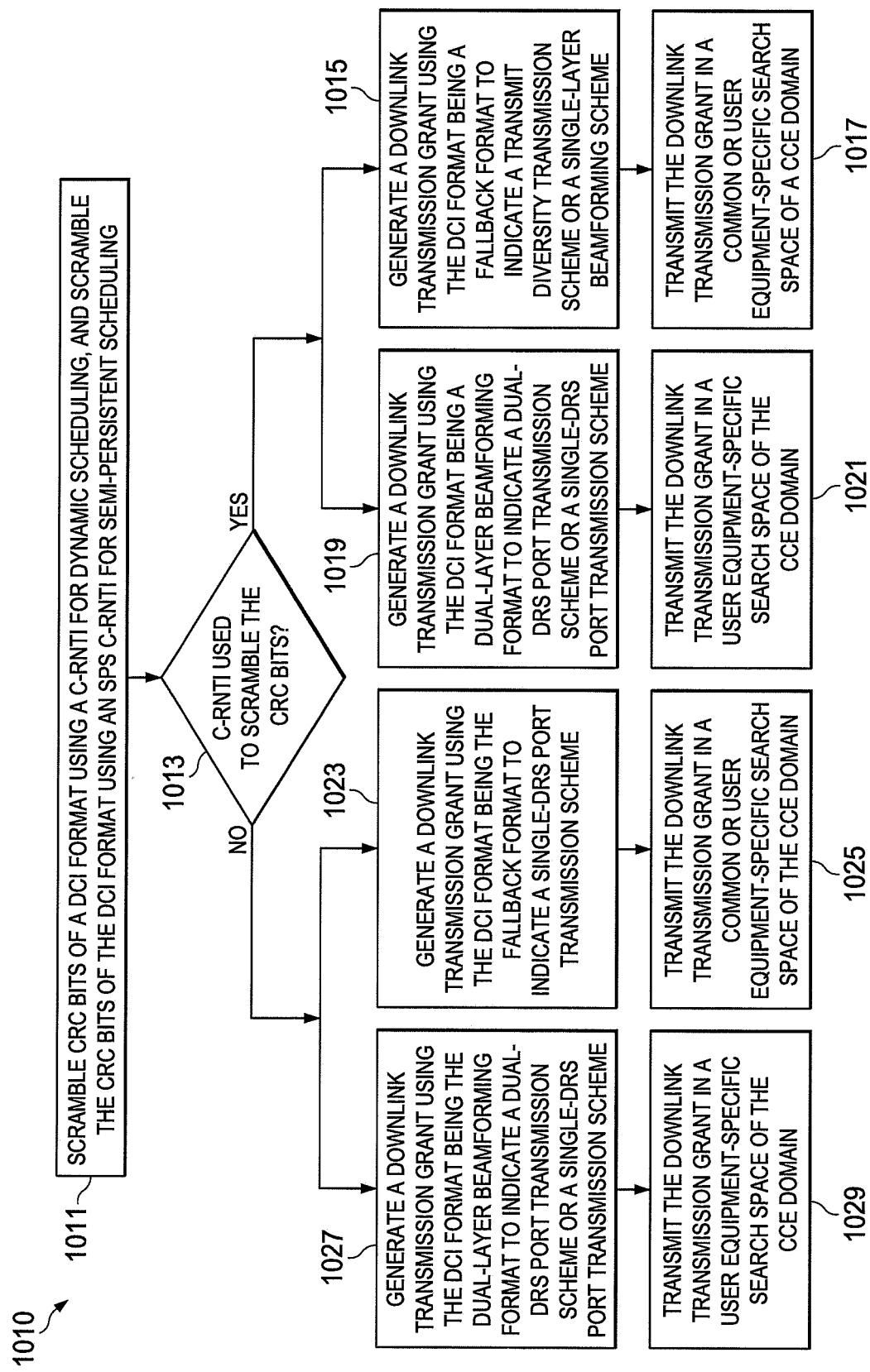
FIG. 10B illustrates a method of operating a base station according to an embodiment of this disclosure.

FIG. 10B illustrates a method 1010 of operating a base station according to an embodiment of this disclosure.

As shown in FIG. 10B, the method 1010 comprising scrambling cyclic redundancy check (CRC) bits of a downlink control information (DCI) format using a cell radio network temporary identifier (C-RNTI) for dynamic scheduling, and scrambling the CRC bits of the DCI format using a semi-persistent scheduling (SPS) C-RNTI for semi-persistent scheduling (block 1011).

If C-RNTI is used to scramble the CRC bits (block 1013), the method 1001 includes generating a downlink transmission grant using the DCI format having a fallback format to indicate a transmit diversity transmission scheme or a single-layer beamforming scheme (block 1015), and transmitting the downlink transmission grant in a common or user equipment-specific search space of a control channel (CCE) domain (block 1017). The method 1001 also includes generating a downlink transmission grant using the DCI format being a dual-layer beamforming format to indicate a dual-dedicated reference signal (DRS) port transmission scheme or a single-DRS port transmission scheme (block 1019), and transmitting the downlink transmission grant in a user equipment-specific search space of the CCE domain (block 1021).

If SPS C-RNTI is used to scramble the CRC bits (block 1013), the method 1001 includes generating a downlink transmission grant using the DCI format being the fallback format to indicate a single-DRS port transmission scheme (block 1023), and transmitting the downlink transmission grant in a common or user equipment-specific search space of the CCE domain (block 1025). The method 1001 also includes generating a downlink transmission grant using the DCI format being the dual-layer beamforming format to indicate a dual-DRS port transmission scheme or a single-DRS port transmission scheme (block 1027), and transmitting the downlink transmission grant in a user equipment-specific search space of the CCE domain (block 1029).

Furthermore, as indicated in table 1000, a subscriber receives a downlink transmission grant from a base station. The subscriber de-scrambles the cyclic redundancy check (CRC) bits of the downlink transmission grant using a cell radio network temporary identifier (C-RNTI) key, and de-scrambles the CRC bits of the downlink transmission grant using a semi-persistent scheduling (SPS) C-RNTI key.

If the C-RNTI key successfully de-scrambles the CRC bits, the subscriber station determines if the downlink transmission grant utilizes a downlink control information (DCI) format being a fallback format or a dual-layer beamforming format. If the downlink transmission grant utilizes a DCI format being the fallback format, the subscriber station determines that a transmit diversity transmission scheme or a single-layer beamforming scheme is used by the base station. If the downlink transmission grant utilizes a DCI format being the dual-layer beamforming format, the subscriber station determines that a dual-dedicated reference signal (DRS) port transmission scheme or a single-DRS port transmission scheme is used by the base station.

If the SPS C-RNTI key successfully de-scrambles the CRC bits, the subscriber station determines if the downlink transmission grant utilizes a DCI format being the fallback format or the dual-layer beamforming format. If the downlink transmission grant utilizes a DCI format being the fallback format, the subscriber station determines that a single-DRS port transmission scheme is used by the base station. If the downlink transmission grant utilizes a DCI format being the dual-layer beamforming format, the subscriber station determines that a dual-DRS port transmission scheme or a single-DRS port transmission scheme is used by the base station.

Figure 10C:
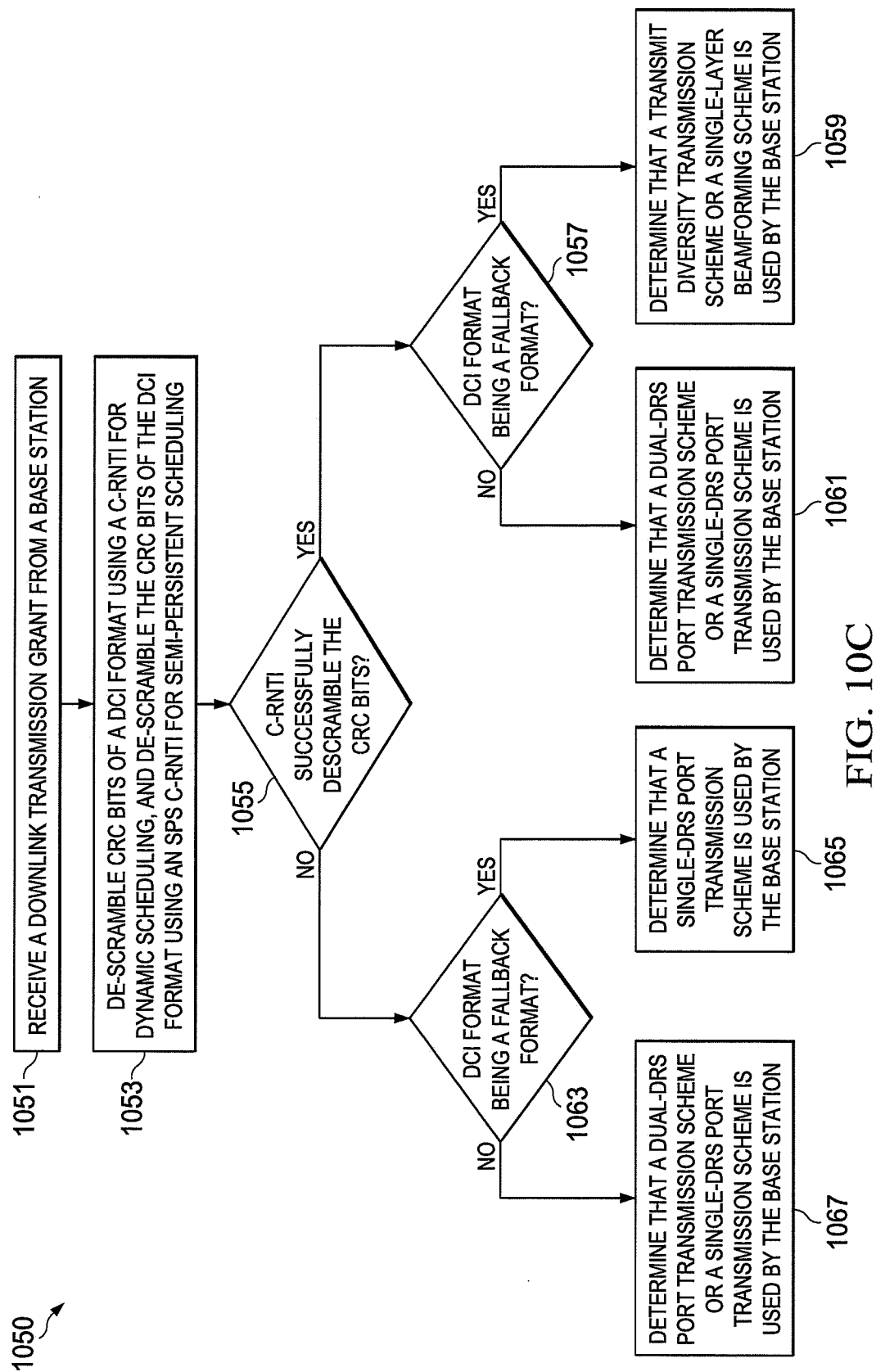
FIG. 10C illustrates a method of operating a subscriber station according to an embodiment of this disclosure.

FIG. 10C illustrates a method 1050 of operating a subscriber station according to an embodiment of this disclosure.

As shown in FIG. 10C, the method 1050 includes receiving a downlink transmission grant from a base station (block 1051). The method 1050 also includes de-scrambling cyclic redundancy check (CRC) bits of the downlink transmission grant using a cell radio network temporary identifier (C-RNTI) key, and de-scrambling the CRC bits of the downlink transmission grant using a semi-persistent scheduling (SPS) C-RNTI key (block 1053).

If the C-RNTI key successfully de-scrambles the CRC bits (block 1055), the method includes determining if the downlink transmission grant utilizes a downlink control information (DCI) format being a fallback format or a dual-layer beamforming format (block 1057). If the downlink transmission grant utilizes a downlink control information (DCI) format being the fallback format, the method 1050 further includes determining that a transmit diversity transmission scheme or a single-layer beamforming scheme is used by the base station (block 1059). If the downlink transmission grant utilizes a downlink control information (DCI) format being the dual-layer beamforming format, the method 1050 further includes determining that a dual-dedicated reference signal (DRS) port transmission scheme or a single-DRS port transmission scheme is used by the base station (block 1061).

If the SPS C-RNTI key successfully de-scrambles the CRC bits (block 1055), the method 1050 includes determining if the downlink transmission grant utilizes a downlink control information (DCI) format being the fallback format or the dual-layer beamforming format (block 1063). If the downlink transmission grant utilizes a downlink control information (DCI) format being the fallback format, the method 1050 further includes determining that a single-DRS port transmission scheme is used by the base station (block 1065). If the downlink transmission grant utilizes a downlink control information (DCI) format being the dual-layer beamforming format, the method 1050 further includes determining that a dual-DRS port transmission scheme or a single-DRS port transmission scheme is used by the base station (block 1067).

FIG. 11 illustrates a table 1100 showing a mapping of enabled codewords to a stream index and a dedicated reference signal (DRS) index according to an embodiment of this disclosure.

In some embodiments of this disclosure, the stream (and the DRS) index is indicated using an enabled codeword (CW) in a DCI format, and the mapping of enabled CWs to the stream index and the DRS index can be described, for example, as shown in table 1100.

FIG. 12 illustrates a table 1200 showing a mapping of a new data indicator (NDI) bit of a disabled codeword to a stream index and a dedicated reference signal (DRS) index according to an embodiment of this disclosure.

As shown in FIG. 12, the stream (and the DRS) index is indicated using an NDI bit for a disabled CW in a DCI format, and the mapping of the NDI bit of a disabled CW to the stream index and the DRS index can be described, for example, as shown in table 1200.

Figure 13:
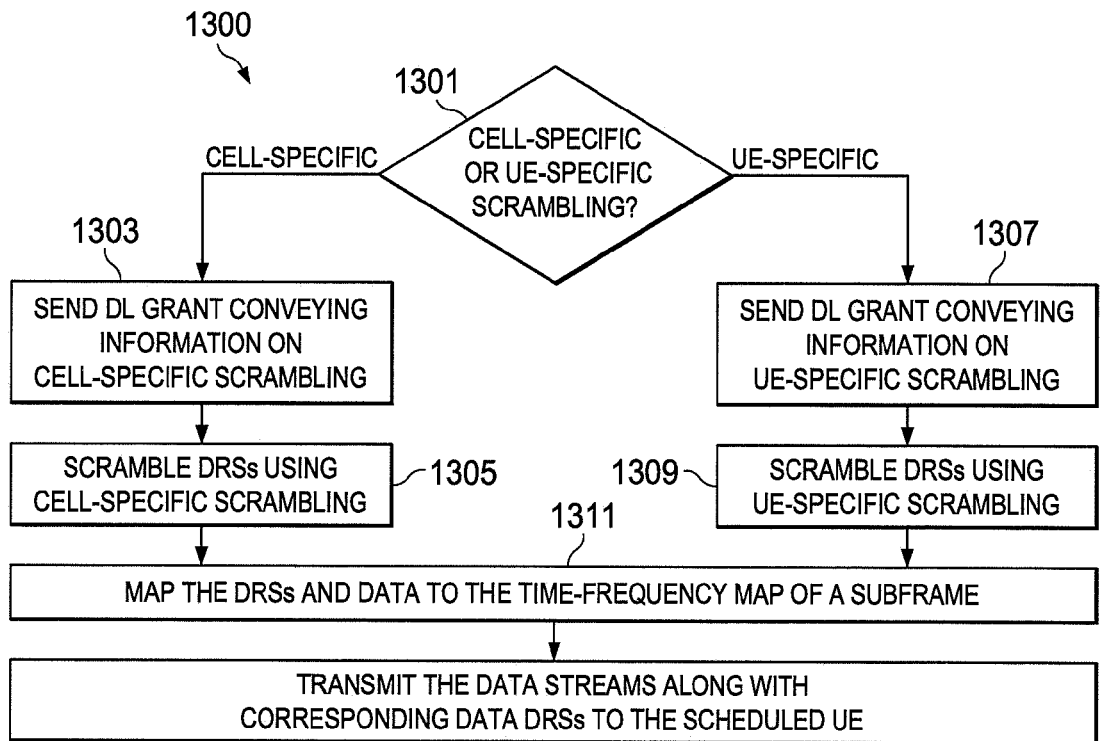
FIG. 13 illustrates a method of operating a base station or eNodeB according to another embodiment of this disclosure.

FIG. 13 illustrates a method 1300 of operating a base station or eNodeB according to another embodiment of this disclosure.

In some embodiments, the choice of the DRS scrambling method is indicated by an eNodeB to a UE using the downlink grant. As shown in FIG. 13, an eNodeB determines if a cell-specific or a UE-specific scrambling method is being used to scramble the DRSs of a scheduled UE (block 1301). If the eNodeB determined that a cell-specific scrambling method is to be used, the eNodeB sends a DL grant conveying information on the cell-specific scrambling method used by the eNodeB (block 1303), and scrambles the DRSs for the scheduled UE using the cell-specific scrambling method (block 1305). If the eNodeB determined that a UE-specific scrambling method is to be used, the eNodeB sends a DL grant conveying information on the UE-specific scrambling method used by the eNodeB (block 1307), and scrambles the DRSs for the scheduled UE using the UE-specific scrambling method (block 1309). The eNodeB then maps the DRSs and data to the time-frequency map of a subframe (block 1311), and transmits the data streams along with corresponding data DRSs to the scheduled UE (block 1313).

Figure 14:
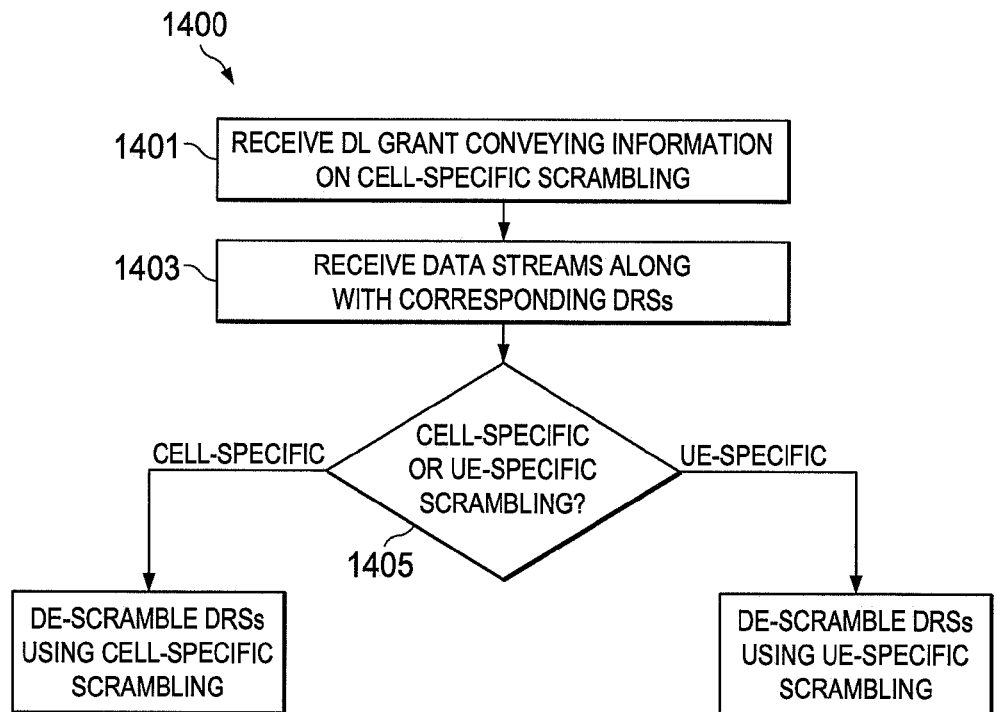
FIG. 14 illustrates a method of operating a subscriber station according to another embodiment of this disclosure.

FIG. 14 illustrates a method 1400 of operating a subscriber station according to another embodiment of this disclosure.

As shown in FIG. 14, a scheduled UE receives a DL grant from a base station or eNodeB (block 1401). The DL grant conveys information on the DRS scrambling method used by the eNodeB. The subscriber station also receives data streams along with corresponding DRSs (block 1403). The subscriber station reads the information in the DL grant to determine if a cell-specific or a UE-specific scrambling method is being used to scramble the DRSs (block 1405). If a cell-specific scrambling method is being used to scramble the DRSs, the subscriber station de-scrambles the DRSs according the cell-specific scrambling method (block 1407). If a UE-specific scrambling method is being used to scramble the DRSs, the subscriber station de-scrambles the DRSs according the UE-specific scrambling method (block 1409).

FIG. 15 illustrates a table 1500 depicting two states of a downlink (DL) grant according to an embodiment of this disclosure.

As shown in table 1500, the two choices are indicated in the DL grant as two states, where the first state indicate cell-specific scrambling of the DRS sequence and the second state indicate the UE-specific scrambling of the DRS sequence.

There are many ways to construct two codepoints in the DL grant to represent these two states. In one embodiment, a one-bit field is added to the DL grant, and this one-bit field is used to indicate these two states. This embodiment applies to any DCI format that an eNodeB uses to send the DL grant to the UE.

FIG. 16 illustrates a table 1600 depicting two states of a downlink (DL) grant using a one-bit field according to an embodiment of this disclosure.

In this particular embodiment, a first value of "0" in the one-bit field indicates the first state in which cell-specific scrambling of the DRS sequence is used. A second value of "1" in the one-bit field indicates the second state in which UE-specific scrambling of the DRS sequence is used.

FIG. 17 illustrates a table 1700 depicting use of the number of enabled transport blocks (TBs) to indicate the choice of cell-specific scrambling or UE-specific scrambling according to an embodiment of this disclosure.

As shown in table 1700, the number of enabled TBs (1 or 2) in the DL grant is used to indicate the choice of cell-specific scrambling or UE-specific scrambling. This embodiment is applicable for the DCI formats that can indicate two TBs, for example, the 2A' DCI format mentioned above (which is based on 2A). For the case when the DCI format only supports 1 TB, the choice of scrambling method is dependent on the transmission schemes. For example, if the transmit diversity is used, then UE-specific scrambling is adopted. Conversely, if a single-DRS port scheme is used, cell-specific scrambling is adopted.

In this embodiment, please note that 1A' refers to a slightly modified version of format 1A. Also, current Rel-8 only allows combination of C-RNTI with Transmit Diversity, and SPS-RNTI with single DRS-port transmission scheme. However, in Rel-9 and beyond, the other two combinations (C-RNTI with single DRS-port, and SPS-RNTI with Transmit diversity) may also be possible.

For the case of DCI format 2A or 2A', one of ordinary skill in the art would recognize that the above embodiment can be combined with any method of indicating the DRS port index. For the case of DCI format 1A or 1A', one of ordinary skill in the art also would recognize that the above embodiment can be combined with a semi-static indication of the DRS port index such as by radio resource control (RRC) signaling, or a fixed indication of the DRS port such as by associating the DRS port index with a UE ID, etc.

In one embodiment of this disclosure, an existing bit in a particular DL grant is reinterpreted to indicate these two states. This embodiment is also applicable for the DCI formats that can indicate two TBs, for example, the 2A' DCI format mentioned above (which is based on 2A).

In particular, this embodiment provides that if both TB1 and TB2 are enabled, then UE-specific scrambling is always used (to allow transparent MU-MIMO).

If one of the TBs is disabled, then the codepoints needed to represent the two states (of the scrambling method) is given by reinterpreting either the NDI bit of the disabled TB or the TB to CW mapping bit (which is similar to using the two codepoints (states) of the enabled CW index as depicted in table 1100). Furthermore, if one of the TBs is disabled, the same set of codepoints can also be used to indicate whether the UE should expect a total rank of 1 (SU-MIMO) or 2 (MU-MIMO with each user sending rank-1).

In addition, for the case where the UE receives a DCI format that supports only 1 TB, the treatment is the same as in the above embodiment.

FIG. 18 illustrates a table 1800 depicting use of an existing bit in a particular downlink (DL) grant to indicate the choice of cell-specific scrambling or UE-specific scrambling according to an embodiment of this disclosure.

As noted above, the bit to be reinterpreted could be the NDI bit of the disabled TB, the CW to TB mapping bit, or the two states associated with which CW is enabled.

Please note that in table 1800, total rank>1 is a general formula. In the case of dual-layer beamforming, total rank is 2.

Again, one of ordinary skill in the art would recognize that, for the case of DCI format 2A or 2A', this embodiment can be combined with any method of indicating the DRS port index. For the case of DCI format 1A or 1A', one of ordinary skill in the art also would recognize that this embodiment can be combined with a semi-static indication of the DRS port index such as by RRC signaling, or a fixed indication of the DRS port such by associating the DRS port index with a UE ID, etc.

In another embodiment of this disclosure, the state of the DRS scrambling method is carried semi-statically in higher layer signaling, e.g., RRC signaling.

In one example, the eNodeB would signal a first scrambling method to a UE when the eNodeB intends to use non-transparent MU-MIMO for the UE. The eNodeB would signal a second scrambling method to a UE when the eNodeB intends to use transparent MU-MIMO for the UE.

Figure 19:
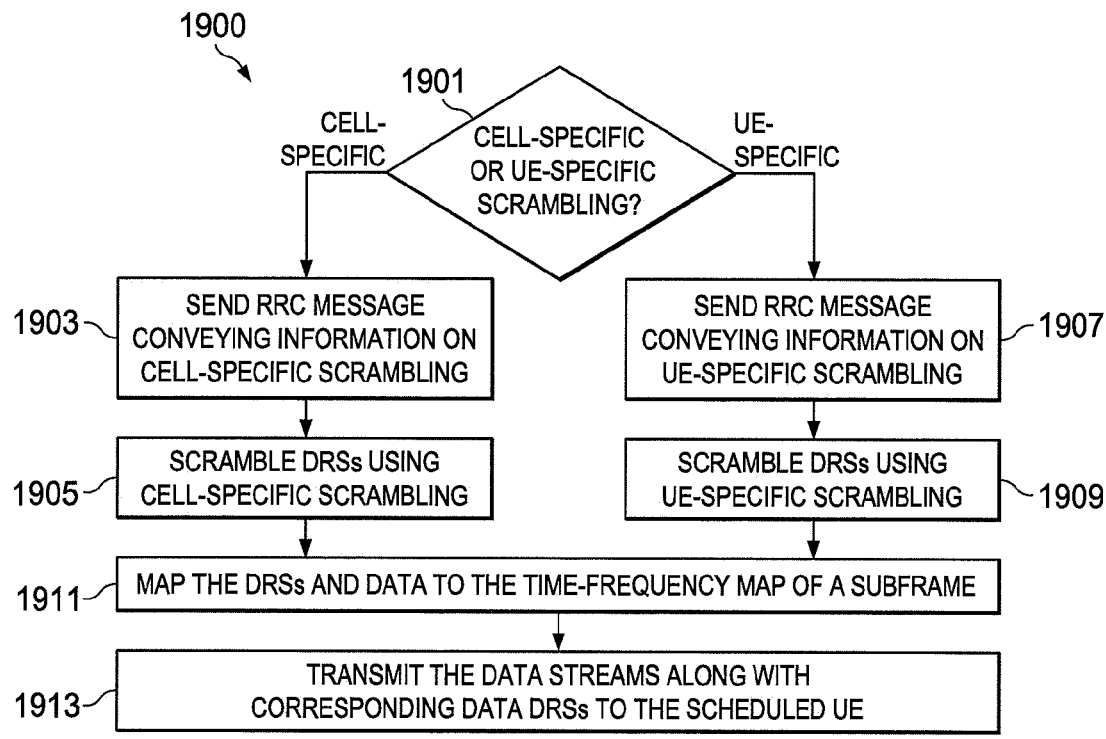
FIG. 19 illustrates a method of operating a base station or eNodeB according to yet another embodiment of this disclosure.

FIG. 19 illustrates a method 1900 of operating a base station or eNodeB according to yet another embodiment of this disclosure.

In some embodiments, the choice of the DRS scrambling method is indicated by an eNodeB to a UE using a radio resource control (RRC) message. As shown in FIG. 19, an eNodeB determines if a cell-specific or a UE-specific scrambling method is being used to scramble the DRSs of a scheduled UE (block 1901). If the eNodeB determined that a cell-specific scrambling method is to be used, the eNodeB sends an RRC message conveying information on the cell-specific scrambling method used by the eNodeB (block 1903), and scrambles the DRSs for the scheduled UE using the cell-specific scrambling method (block 1905). If the eNodeB determined that a UE-specific scrambling method is to be used, the eNodeB sends an RRC message conveying information on the UE-specific scrambling method used by the eNodeB (block 1907), and scrambles the DRSs for the scheduled UE using the UE-specific scrambling method (block 1909). The eNodeB then maps the DRSs and data to the time-frequency map of a subframe (block 1911), and transmits the data streams along with corresponding data DRSs to the scheduled UE (block 1913).

Figure 20:
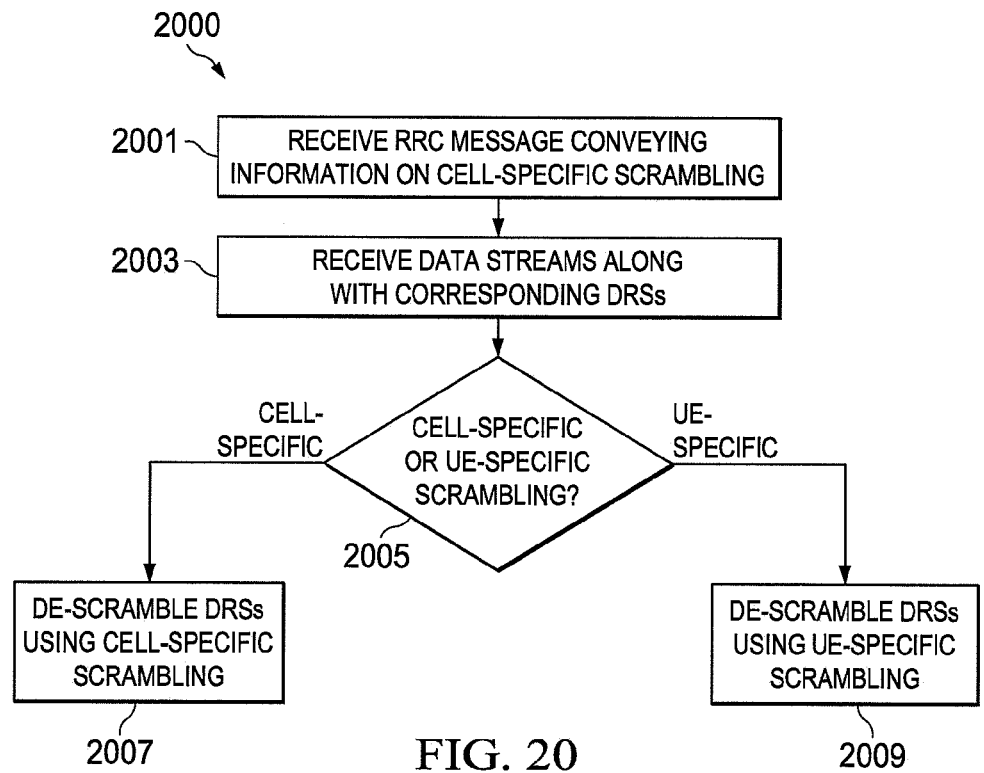
FIG. 20 illustrates a method of operating a subscriber station according to yet another embodiment of this disclosure.

FIG. 20 illustrates a method 2000 of operating a subscriber station according to yet another embodiment of this disclosure.

As shown in FIG. 20, a scheduled UE receives an RRC message from a base station or eNodeB (block 2001). The RRC message conveys information on the DRS scrambling method used by the eNodeB. The subscriber station also receives data streams along with corresponding DRSs (block 2003). The subscriber station reads the information in the RRC message to determine if a cell-specific or a UE-specific scrambling method is being used to scramble the DRSs (block 2005). If a cell-specific scrambling method is being used to scramble the DRSs, the subscriber station descrambles the DRSs according the cell-specific scrambling method (block 2007). If a UE-specific scrambling method is being used to scramble the DRSs, the subscriber station de-scrambles the DRSs according the UE-specific scrambling method (block 2009).

In 3GPP LTE, a procedure is provided for a UE to find its control message (e.g., a transmission grant) in the control channel element (CCE) domain. Each UE is assigned a UE-specific search space in the CCE domain, and all UEs that establish connection with an eNodeB are assigned a common search space in the CCE domain.

Figure 21:
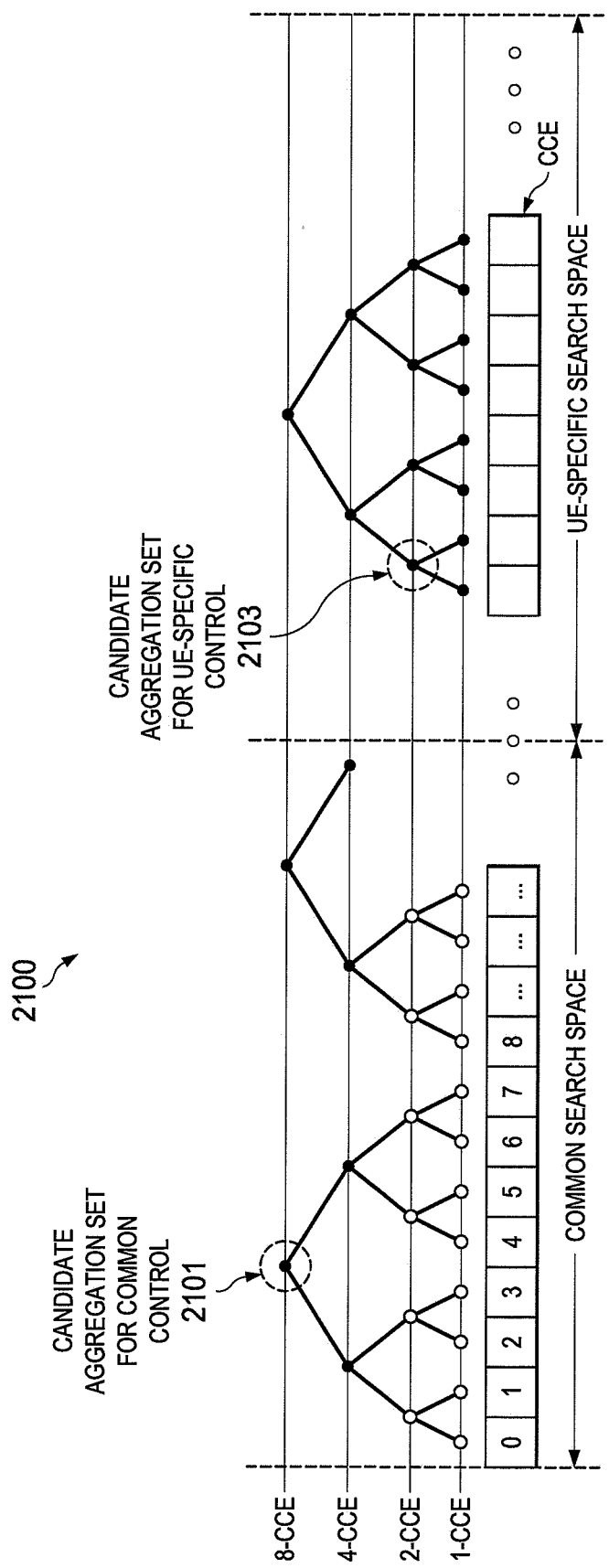
FIG. 21 illustrates a search space composed of a set of consecutive the control channel element (CCEs) according to an embodiment of this disclosure.

FIG. 21 illustrates a search space composed of a set of consecutive the control channel element (CCEs) according to an embodiment of this disclosure.

Given a search space, a UE attempts to find control messages intended for itself by searching throughout the nodes in the tree 2100 shown in FIG. 21, where each node in the tree 2100 corresponds to an aggregation of 1, 2, 4 or 8 CCEs. For example, the node 2101 corresponds to an aggregation of 8 consecutive CCEs whose leaf nodes have contact, i.e., CCEs 0, 1, . . . 7. Given an aggregation of CCEs, a UE assumes a certain DCI format, extracts information bits in the aggregation, and compares the extracted RNTI with the UE's RNTI. Once a UE determines that the extracted RNTI is the same as its RNTI, the UE determines that the decoded control message is intended to itself.

As shown in FIGS. 4 and 5, an eNodeB may send a number of data streams to a number of UEs, and this operation is called a multi-user MIMO (MU-MIMO) operation. In one transmission mode, an eNodeB is able to transmit up to two streams in a time-frequency resource, and up to two UEs may receive at least one stream each in the time-frequency resource. In another transmission mode, an eNodeB is able to transmit up to four streams in a time-frequency resource, and up to four UEs may receive at least one stream each in the time-frequency resource.

Since multiple streams are transmitted by an eNodeB, each UE is supposed to identify its stream by a certain means. Once a UE identifies its streams, the UE uses dedicated reference signals (DRSs) associated with the streams to estimate channels for the demodulation of the transmitted streams. In particular embodiments of this disclosure, it is assumed that the DRSs for the streams are orthogonal to each other.

For example, for the demodulation of stream #0, a UE estimates channels using DRS #0 where DRS #0 is precoded with the same precoder used to precode the data stream #0. For the demodulation of stream #1, a UE estimates channels using DRS #1 where DRS #1 is precoded with the same precoder used to precode the data stream #1. For example, with the reference signal pattern 610 of FIG. 6, the DRS REs for DRS #0 are the RS REs labeled with 0, while the DRS REs for DRS #1 are the RS REs labeled with 1. On the other hand, with the reference signal pattern 620 of FIG. 6, the DRS #0 is multiplexed with DRS #1 in the same set of pairs of RS REs, and a Walsh code [1 1] is used for DRS #0, while a Walsh code [1-1] is used for DRS #1.

In order to support MU-MIMO, an eNodeB determines a transmission mode for UEs by higher-layer signaling. A few transmission modes are considered in this disclosure. In one transmission mode (denoted by transmission mode A), a UE can receive up to two streams and up to two DRSs associated with the two streams, and an eNodeB can schedule up to two data streams and up to two DRSs at most to a number of UEs in a unit of time-frequency resource. UEs in this transmission mode are aware that the DRS REs for the two DRSs do not carry data symbols for themselves.

In another transmission mode (denoted by transmission mode B), a UE can receive up to two streams and up to two DRSs associated with the two streams, and an eNodeB can schedule up to four data streams and up to four DRSs to a number of UEs in a unit of time-frequency resource. UEs in this transmission mode are aware that the DRS REs for the four DRSs do not carry data symbols for themselves.

In another transmission mode (denoted by transmission mode C), a UE can receive up to two streams and up to two DRSs associated with the two streams, and an eNodeB can schedule up to four data streams and up to four DRSs to a number of UEs in a unit of time-frequency resource, just as in transmission mode B. The difference between transmission mode C and transmission mode B is that each UE in transmission mode C receives an indication from eNodeB as to which DRSs are allocated to the UE and other UEs in the assigned resources and thus is aware of the exact position of DRS REs that do not carry data symbols.

In another transmission mode (denoted by transmission mode D), a UE can receive up to four streams and up to four DRSs associated with the four streams, and an eNodeB can schedule up to four data streams and up to four DRSs to a number of UEs in a unit of time-frequency resource. In this transmission mode, each UE receives an indication from the eNodeB as to which DRSs are allocated to the UE and thus is aware that the DRS REs for the four DRSs do not carry data symbols for themselves.

This disclosure provides different ways for an eNodeB to indicate the set of streams assigned to a UE in various transmission modes.

In a given transmission mode and given an indication of the stream and DRS indices, a UE demodulates its data streams by estimating the channels associated with the streams using the associated DRSs. Stream or DRS indices together with the restrictions made in a transmission mode let the UE know where to find DRS symbols and data symbols in the time-frequency map. For example, when FDM/TDM pilots in FIG. 6 are used for a UE in transmission mode A, a UE finds the DRS symbols and data symbols as illustrated in FIG. 8 based on the DRS index signaled to itself.

In a first part of this disclosure, UEs in transmission mode A will be considered. In transmission mode A, a UE can receive up to two streams and up to two DRSs associated with the two streams, and an eNodeB can schedule up to two data streams and up to two DRSs at most to a number of UEs in a unit of time-frequency resource. The UE's behavior when a stream index is signaled can be described as shown in FIG. 8, in the case of FDM/TDM pilots, for example. For UEs in transmission mode A, four methods of indicating the stream index are provided.

In one embodiment of this disclosure (denoted by method A-1), the stream index for a UE is linked with the UE-ID number, for example, the RNTI number in 3GPP LTE.

In one transmission instance (denoted by transmission instance A-1-1), an eNodeB schedules two UEs with different even-odd parity of UE-ID numbers in a time-frequency resource and transmits two streams, stream #0 and stream #1. Here, stream #0 and DRS #0 are intended to a UE with an even UE-ID, while stream #1 and DRS #1 are intended to a UE with an odd UE-ID.

In another transmission instance (denoted by transmission instance A-1-2), an eNodeB schedules only one UE in a time-frequency resource and transmits two streams, stream #0 and stream #1 to the UE.

In another transmission instance (denoted by transmission instance A-1-3), an eNodeB schedules only one UE in a time-frequency resource and transmits one stream, either stream #0 or stream #1 to the UE, depending on the parity of the UE's ID number.

Figure 22:
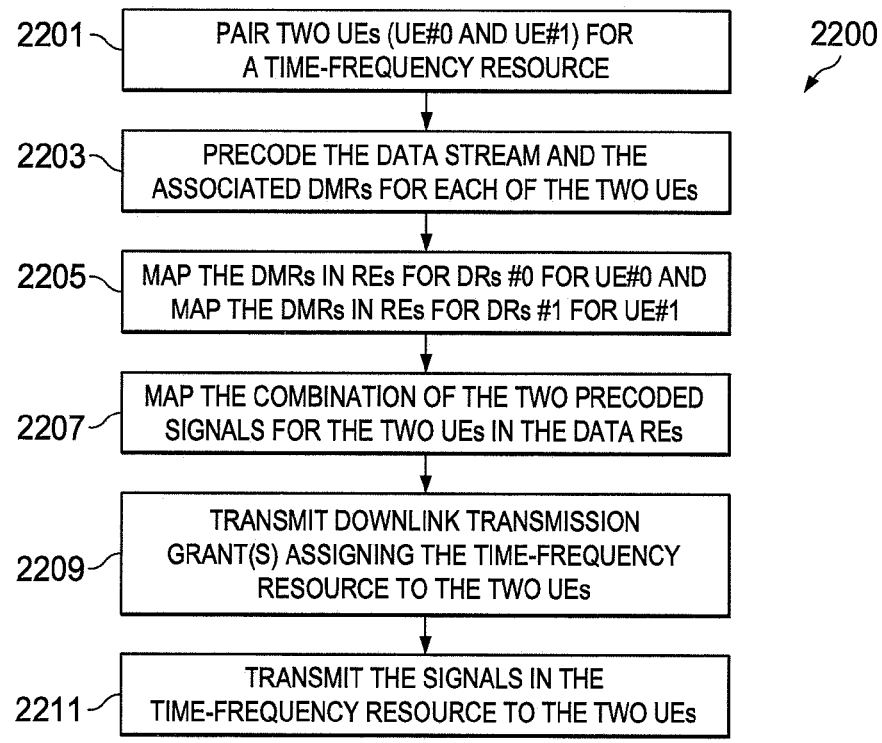
FIG. 22 illustrates a method of operating an eNodeB or base station according to a first embodiment of this disclosure.

FIG. 22 illustrates a method 2200 of operating an eNodeB or base station according to a first embodiment of this disclosure.

As shown in FIG. 22, an eNodeB pairs two UEs (UE#0 and UE#1) for a time-frequency resource (block 2201). The two UEs have UE-IDs with different even-odd parity. The eNodeB then precodes the data stream and the associated DMRS for each of the two UEs (block 2203). The eNodeB maps the DMRS in REs for DRS #0 for UE#0 and maps the DMRS in REs for DRS #1 for UE#1 (block 2205). The eNodeB also maps the combination of the two precoded signals for the two UEs in the data REs (block 2207). The eNodeB then transmits downlink transmission grant(s) assigning the time-frequency resource to the two UEs (block 2209) and transmits the signals in the time-frequency resource to the two UEs (block 2211).

In the transmission instance A-1-1, a UE with an even UE-ID (UE#0) estimates the channels using the received signals in the REs for DRS#0, while the other UE with an odd UE-ID (UE#1) estimates the channels using the received signals in the REs for DRS#1. These estimated channels are used for demodulation of the data stream at each UE.

Figure 23:
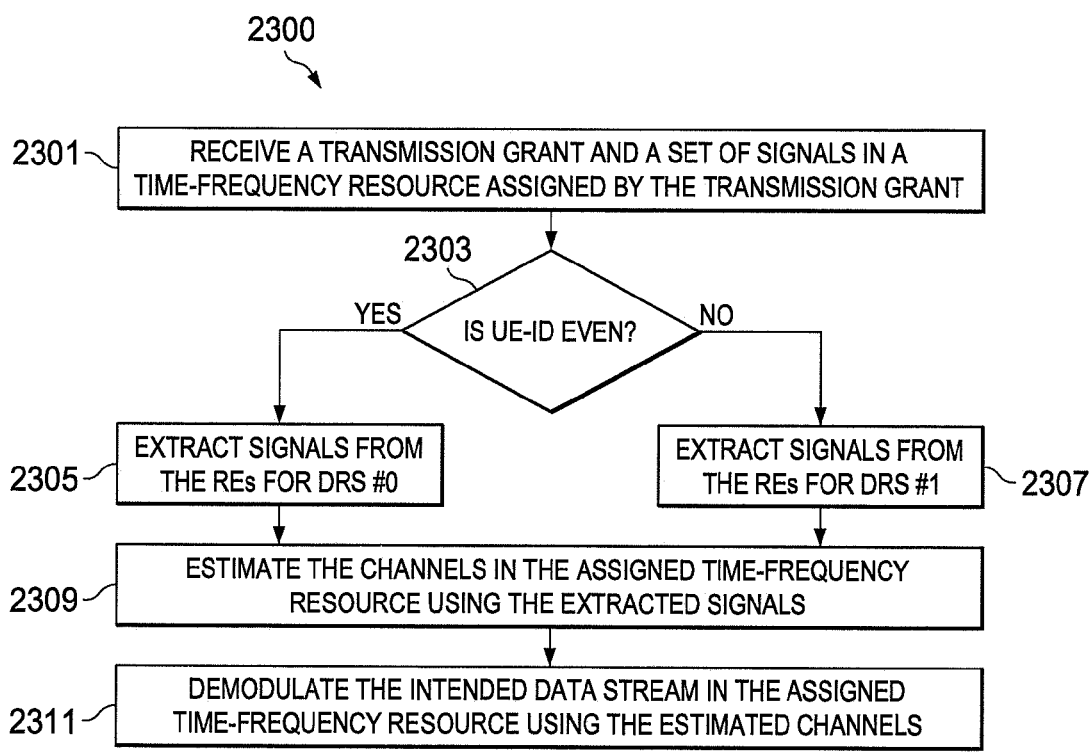
FIG. 23 illustrates a method of operating a UE or subscriber station according to a first embodiment of this disclosure.

FIG. 23 illustrates a method 2300 of operating a UE or subscriber station according to a first embodiment of this disclosure.

As shown in FIG. 23, a UE receives a transmission grant and a set of signals in a time-frequency resource assigned by the transmission grant from an eNodeB (block 2301). The UE then determines if the UE's UE-ID is even (block 2303). If the UE's UE-ID is even, the UE extracts signals from the REs for DRS#0 (block 2305). If the UE's UE-ID is not even, the UE extracts signals from the REs for DRS#1 (block 2307). The UE then estimates the channels in the assigned time-frequency resource using the extracted signals (block 2309). The UE also demodulates the intended data stream in the assigned time-frequency resource using the estimated channels (block 2311).

In transmission instance A-1-2, a UE estimates two channels using the received signals in the REs for both DRS#0 and DRS#1. The two estimated channels are used for the demodulation of the two data streams at the UE.

In transmission instance A-1-3, a UE estimates one channel using the received signals in the REs for DRS#0 if its UE-ID is even, and uses the received signals in the REs for DRS#1 if its UE-ID is odd.

In another embodiment of this disclosure (denoted by method A-2), the stream index for a UE is linked with the parity of a control channel element (CCE) number, where the CCE number is one logical index of the CCEs that have carried downlink grant for the UE.

In one transmission instance (denoted by transmission instance A-2-1), an eNodeB schedules two UEs UE#0 and UE#1 in a time-frequency resource and transmits two streams, stream #0 and stream #1. In this particular instance, stream #0 and DRS #0 are intended for UE#0, while stream #1 and DRS #1 are intended for UE#1. The eNodeB sends a transmission grant to UE#0 in a set of consecutive CCEs, where the index of the first CCE is even. On the other hand, the eNodeB sends a transmission grant in a set of consecutive CCEs to UE#1, where the index of the first CCE is odd.

In another transmission instance (denoted by transmission instance A-2-2), an eNodeB schedules only one UE in a time-frequency resource and transmits two streams, stream #0 and stream #1, to the UE.

In another transmission instance (denoted by transmission instance A-2-3), an eNodeB schedules only one UE in a time-frequency resource and transmits one stream, either stream #0 or stream #1, to the UE. When stream #0 is to be sent to the UE, the eNodeB sends a transmission grant in a set of consecutive CCEs, where the index of the first CCE is even. When stream #1 is to be sent to the UE, the eNodeB sends a transmission grant in a set of consecutive CCEs, where the index of the first CCE is odd.

Figure 24:
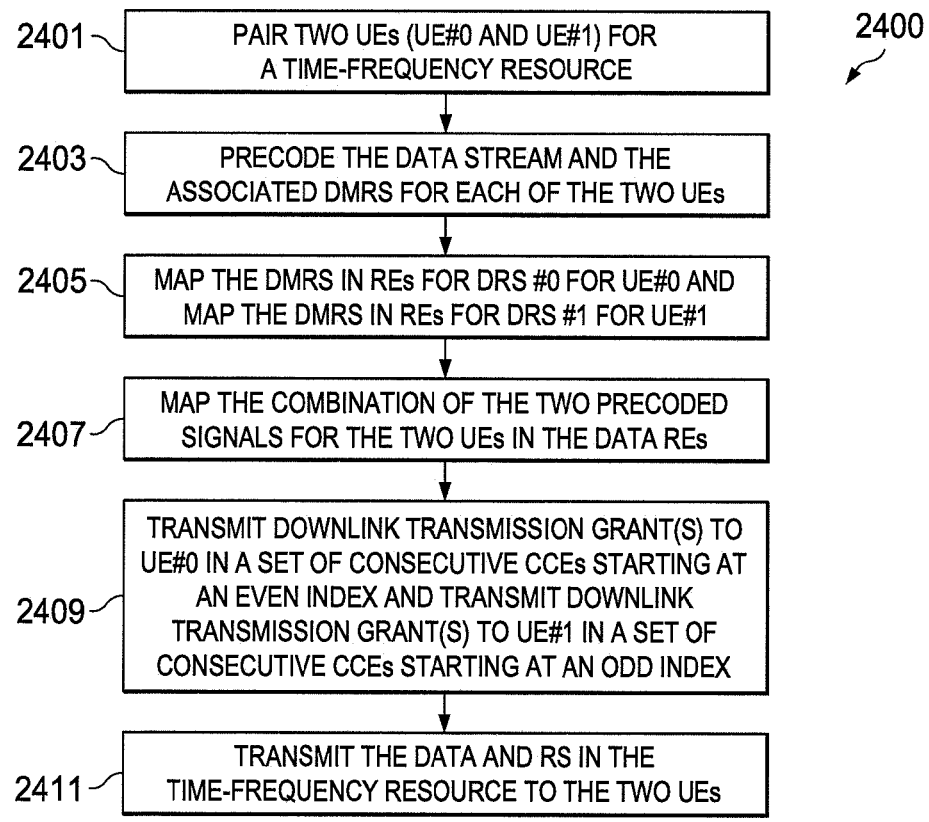
FIG. 24 illustrates a method of operating an eNodeB or base station according to a second embodiment of this disclosure.

FIG. 24 illustrates a method 2400 of operating an eNodeB or base station according to a second embodiment of this disclosure.

As shown in FIG. 24, an eNodeB pairs two UEs (UE#0 and UE#1) for a time-frequency resource (block 2401). The eNodeB then precodes the data stream and the associated DMRS for each of the two UEs (block 2403). In some embodiments, the precoders used for the two UEs can be different from one another. The eNodeB maps the DMRS in REs for DRS #0 for UE#0 and maps the DMRS in REs for DRS #1 for UE#1 (block 2405). The eNodeB also maps the combination of the two precoded signals for the two UEs in the data REs (block 2407). The eNodeB then transmits downlink transmission grant(s) to UE#0 in a set of consecutive CCEs starting at an even index and transmits downlink transmission grant(s) to UE#1 in a set of consecutive CCEs starting at an odd index (block 2409). The eNodeB then transmits the signals in the time-frequency resource to the two UEs (block 2411).

In transmission instance A-2-1, a UE that has received a downlink grant starting at an even CCE estimates the channels using the received signals in the REs for DRS#0, while another UE that has received the downlink grant starting at an odd index estimates the channels using the received signals in the REs for DRS#1. These estimated channels are used for the demodulation of the data stream at each UE.

Figure 25:
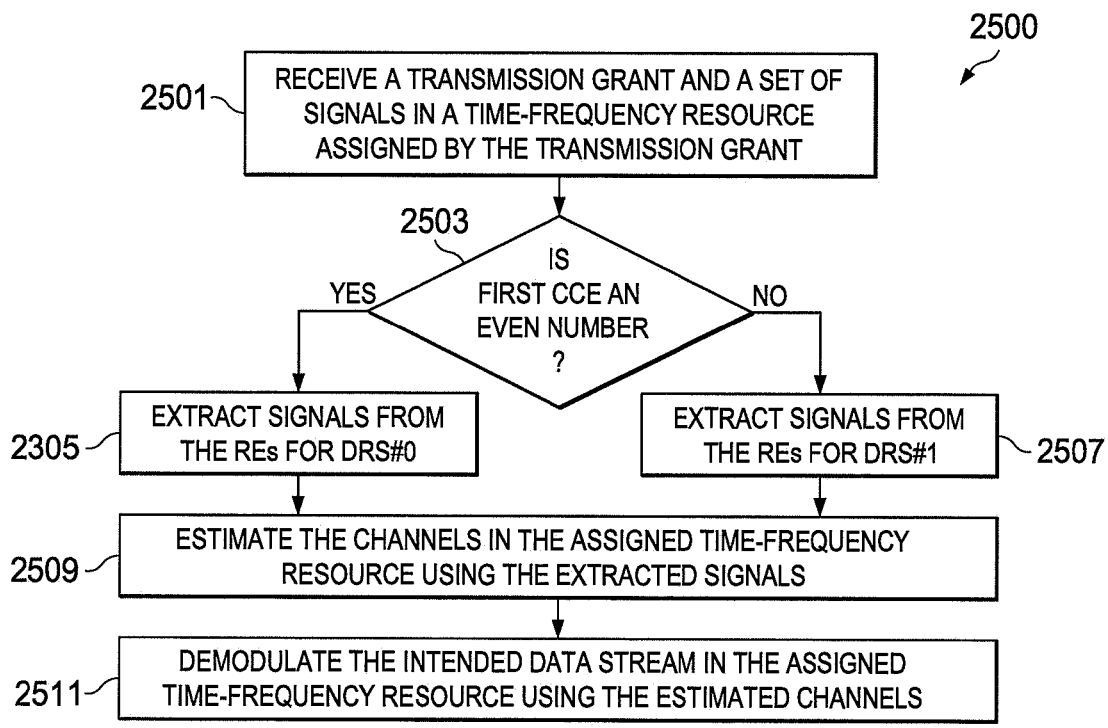
FIG. 25 illustrates a method of operating a UE or subscriber station according to a second embodiment of this disclosure.

FIG. 25 illustrates a method 2500 of operating a UE or subscriber station according to a second embodiment of this disclosure.

As shown in FIG. 25, a UE receives a transmission grant and a set of signals in a time-frequency resource assigned by the transmission grant from an eNodeB (block 2501). The UE then determines if the first CCE number that carried the transmission grant is even (block 2503). If the first CCE number that carried the transmission grant is even, the UE extracts signals from the REs for DRS#0 (block 2505). If the first CCE number that carried the transmission grant is not even, the UE extracts signals from the REs for DRS#1 (block 2507). The UE then estimates the channels in the assigned time-frequency resource using the extracted signals (block 2509). The UE also demodulates the intended data stream in the assigned time-frequency resource using the estimated channels (block 2511).

In transmission instance A-2-2, a UE estimates two channels using the received signals in the REs for both DRS#0 and DRS#1. The two estimated channels are used for the demodulation of the two data streams at the UE.

In transmission instance A-2-3, a UE estimates one channel using the received signals in the REs for DRS#0 if the UE has received downlink grant in the CCEs starting at an even index, in the REs for DRS#1 if the UE has received downlink grant in the CCEs starting at an odd index.

In another embodiment of this disclosure (denoted by method A-3), the stream index for a UE is linked with the location of the control channel element (CCE) resources in the CCE tree search space, where the CCE resources carry the downlink grant for the UE.

Figure 26:
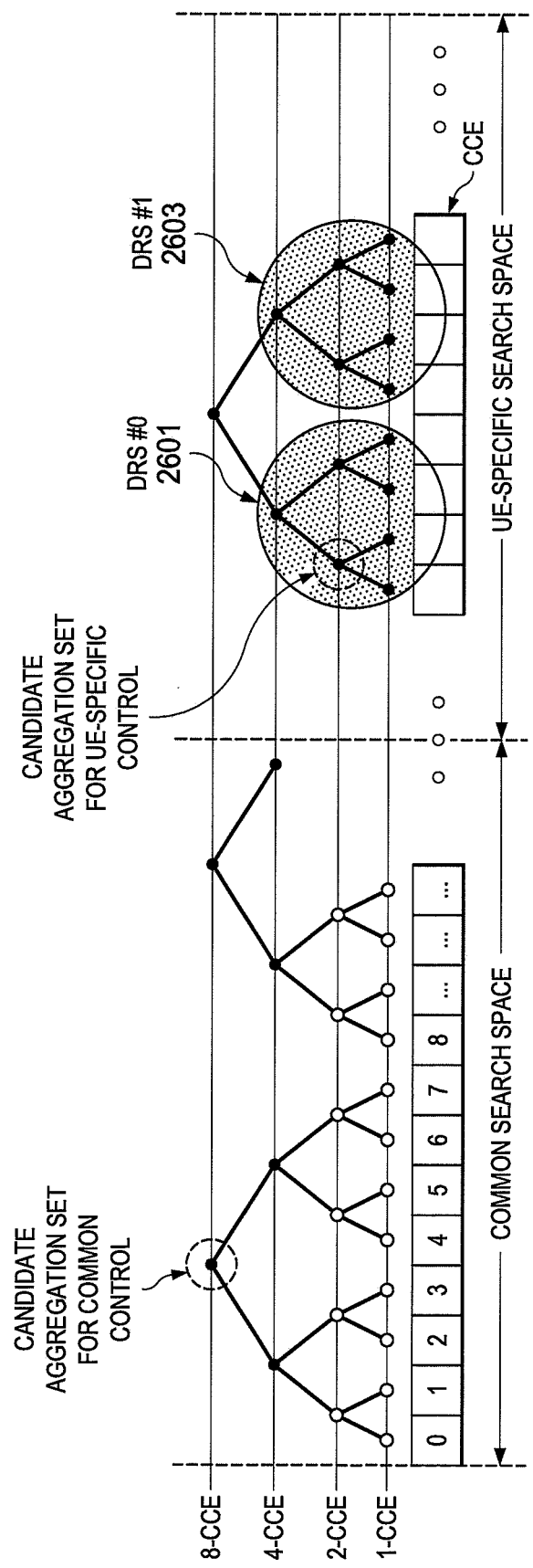
FIG. 26 illustrates a linkage between a location of a control channel element (CCE) aggregation and a stream (or DRS) ID according to an embodiment of this disclosure.

FIG. 26 illustrates a linkage between a location of a control channel element (CCE) aggregation and a stream (or DRS) ID according to an embodiment of this disclosure.

In one transmission instance (denoted by transmission instance A-3-1), an eNodeB schedules two UEs UE#0 and UE#1 in a time-frequency resource and transmits two streams, stream #0 and stream #1. In this instance, stream #0 and DRS #0 are intended for UE#0, while stream #1 and DRS #1 are intended for UE#1. The eNodeB sends a transmission grant to UE#0 in an aggregation of 1, 2 or 4 CCEs, where the aggregation 2601 is allocated on the left hand side of the tree in the UE-specific search space of UE#0. On the other hand, the eNodeB sends a transmission grant to UE#1 in an aggregation of 1, 2 or 4 CCEs, where the aggregation 2603 is allocated on the right hand side of the tree in the UE-specific search space of UE#1.

In another transmission instance (denoted by transmission instance A-3-2), an eNodeB schedules only one UE in a time-frequency resource and transmits two streams, stream #0 and stream #1, to the UE.

In another transmission instance (denoted by transmission instance A-3-3), an eNodeB schedules only one UE in a time-frequency resource and transmits one stream, either stream #0 or stream #1, to the UE. When stream #0 is to be sent to the UE, the eNodeB sends a transmission grant in an aggregation of 1, 2 or 4 CCEs, where the aggregation is allocated on the left hand side of the tree in the UE-specific search space of the UE. When stream #1 is to be sent to the UE, the eNodeB sends a transmission grant in an aggregation of 1, 2 or 4 CCEs, where the aggregation is allocated on the right hand side of the tree in the UE-specific search space of the UE.

Figure 27:
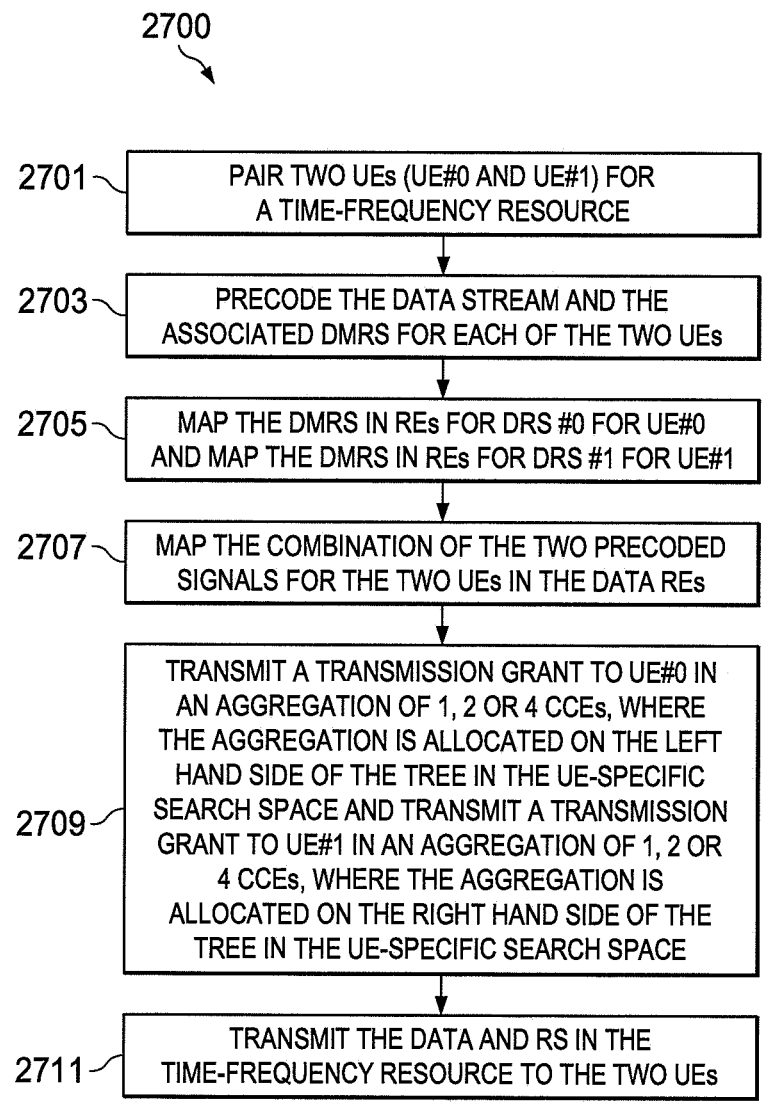
FIG. 27 illustrates a method of operating an eNodeB or base station according to a third embodiment of this disclosure.

FIG. 27 illustrates a method 2700 of operating an eNodeB or base station according to a third embodiment of this disclosure.

As shown in FIG. 27, an eNodeB pairs two UEs (UE#0 and UE#1) for a time-frequency resource (block 2701). The eNodeB then precodes the data stream and the associated DMRS for each of the two UEs (block 2703). In some embodiments, the precoders used for the two UEs can be different from one another. The eNodeB maps the DMRS in REs for DRS #0 for UE#0 and maps the DMRS in REs for DRS #1 for UE#1 (block 2705). The eNodeB also maps the combination of the two precoded signals for the two UEs in the data REs (block 2707). The eNodeB then transmits a transmission grant to UE#0 in an aggregation of 1, 2 or 4 CCEs, where the aggregation is allocated on the left hand side of the tree in the UE-specific search space and transmits a transmission grant to UE#1 in an aggregation of 1, 2 or 4 CCEs, where the aggregation is allocated on the right hand side of the tree in the UE-specific search space (block 2709). The eNodeB then transmits the signals in the time-frequency resource to the two UEs (block 2711).

In transmission instance A-3-1, a UE that has received a downlink grant in a CCE aggregation that is located in the left hand side of the tree in the UE-specific search space estimates the channels using the received signals in the REs for DRS#0, while another UE that has received a downlink grant in a CCE aggregation that is located in the right hand side of the tree in the UE-specific search space estimates the channels using the received signals in the REs for DRS#1. These estimated channels are used for the demodulation of the data stream at each UE.

Figure 28:
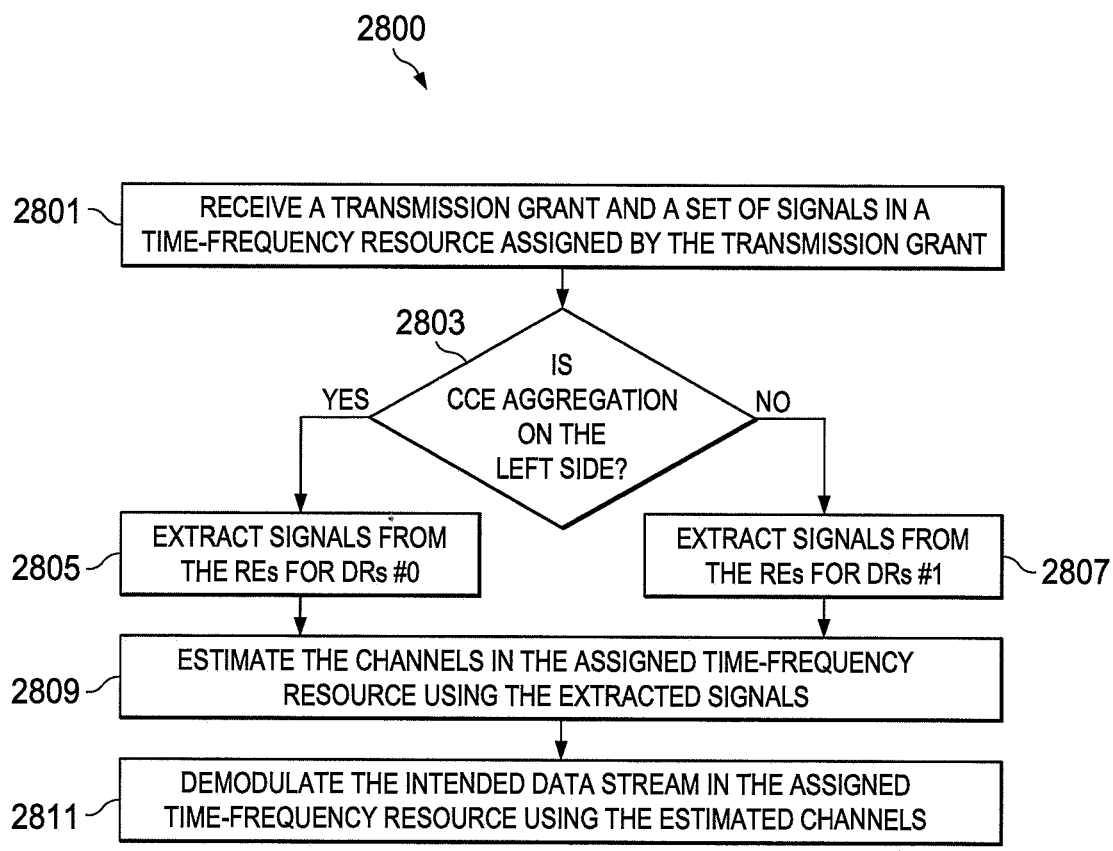
FIG. 28 illustrates a method of operating a UE or subscriber station according to a third embodiment of this disclosure.

FIG. 28 illustrates a method 2800 of operating a UE or subscriber station according to a third embodiment of this disclosure.

As shown in FIG. 28, a UE receives a transmission grant and a set of signals in a time-frequency resource assigned by the transmission grant from an eNodeB (block 2801). The UE then determines if the transmission grant is carried in a CCE aggregation that is located in the left hand side of the tree in the UE-specific search space (block 2803). If the transmission grant is carried in a CCE aggregation that is located in the left hand side of the tree in the UE-specific search space, the UE extracts signals from the REs for DRS#0 (block 2805). If the transmission grant is carried in a CCE aggregation that is located in the right hand side of the tree in the UE-specific search space, the UE extracts signals from the REs for DRS#1 (block 2807). The UE then estimates the channels in the assigned time-frequency resource using the extracted signals (block 2809). The UE also demodulates the intended data stream in the assigned time-frequency resource using the estimated channels (block 2811).

In transmission instance A-3-2, a UE estimates two channels using the received signals in the REs for both DRS#0 and DRS#1. The two estimated channels are used for the demodulation of the two data streams at the UE.

In transmission instance A-3-3, a UE estimates one channel using the received signals in the REs for DRS#0 if the UE has received the downlink grant in a CCE aggregation that is located in the left hand side of the tree in the UE-specific search space, and uses the received signals in the REs for DRS#1 if the UE has received a downlink grant in a CCE aggregation that is located in the right hand side of the tree in the UE-specific search space.

In another embodiment of this disclosure (denoted by method A-4), the stream index and associated DRS index for a UE is implicitly indicated with the enabled codeword index in the downlink grant.

Figure 29:
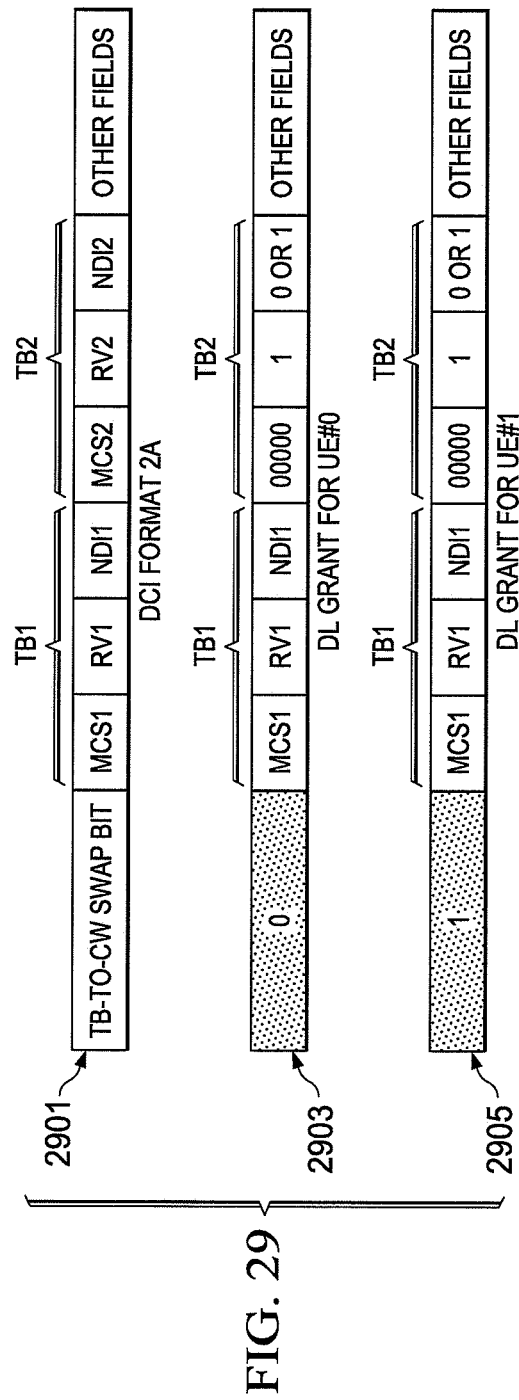
FIG. 29 illustrates downlink (DL) formats according to embodiments of this disclosure.

FIG. 29 illustrates downlink (DL) formats according to embodiments of this disclosure.

If DCI format 2A is used for the downlink grants for the two UEs, the two downlink grants may look like format 2901 if TB1 of UE#0 and TB1 of UE#1 are enabled. In the DL grant for UE#0, the TB-to-CW swap bit is 0, so that TB1 for UE#0 is mapped to CW0, and TB2 is disabled by setting MCS2 to be 0 and RV2 to be 1 as shown in format 2903. In the DL grant for UE#1, the TB-to-CW swap bit is 1, so that TB1 for UE#0 is mapped to CW1, and TB2 is disabled by setting MCS2 to be 0 and RV2 to be 1 as shown in format 2905.

The assigned DRS (stream) indices and the enabled CWs when different TBs are enabled and different values are assigned in TB-to-CW swap bits are summarized as illustrated in table 1100 of FIG. 11. In this particular embodiment, the fourth column (the assigned DRS indices) of table 1100 is determined based on the values in the first three columns.

In a particular embodiment, the CW-to-layer mapping for the 1CW transmission case is modified such that, if the number of layers is 1 and the number of CWs is 1, then)

$$x^{(0)}(i) = d^{(n\_cw)}(i), \text{ and}$$

$$M_{symb}^{layer} = M_{symb}^{(n\_cw)},$$

where n_cw is the enabled CW index, i=0, 1, . . . , $M_{symb}^{layer}-1$ and $M_{symb}^{layer}=M_{symb}^{(n\_cw)}$ is the number of modulation symbols in the enabled CW.

In one transmission instance (denoted by transmission instance A-4-1), an eNodeB schedules two UEs (UE#0 and UE#1) in a time-frequency resource and transmits two TBs (or two streams), one TB for each UE. The eNodeB construct a transmission grant in such a way that UE#0's TB1 or TB2 is mapped to codeword (CW) #0 for UE#0, and that UE#1's TB1 or TB2 is mapped to codeword (CW) #1. For each UE, the eNodeB enables one TB mapped to a CW, and disables the other TB. In this particular instance, CW#0 and CW#1 corresponds to stream #0 and stream #1, respectively.

Figure 30:
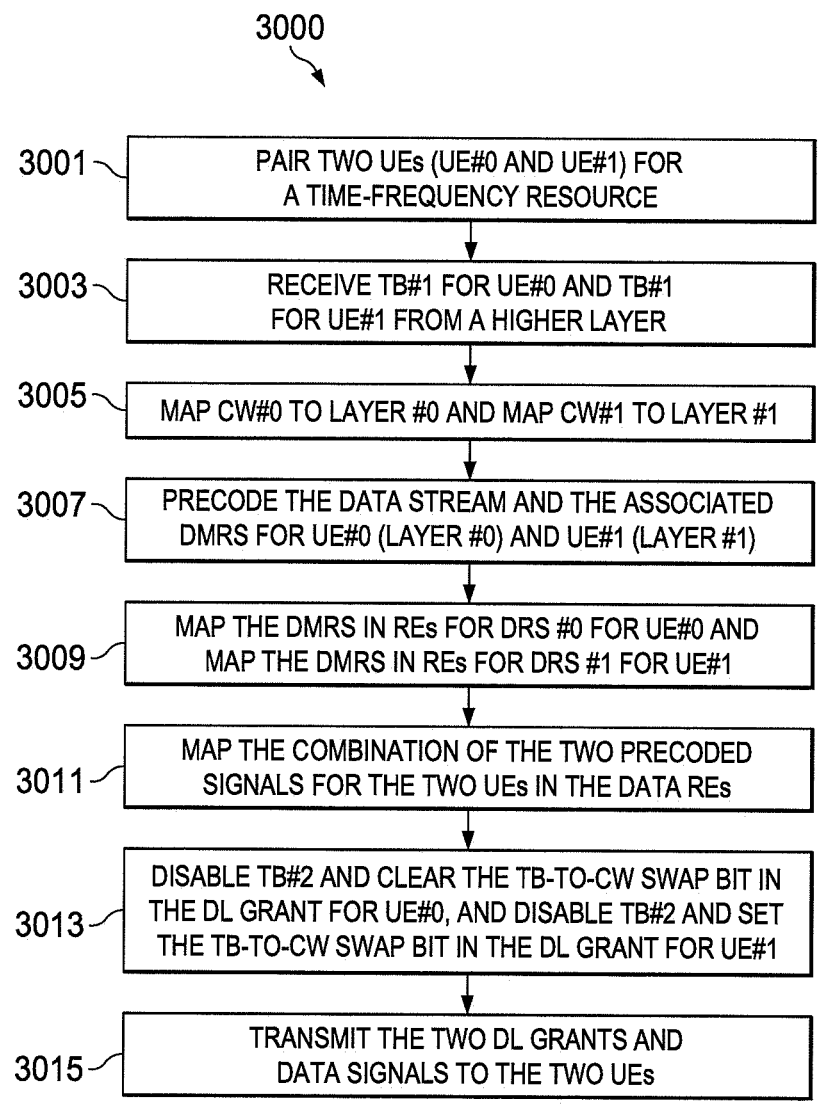
FIG. 30 illustrates a method of operating an eNodeB or base station according to a fourth embodiment of this disclosure.

FIG. 30 illustrates a method 3000 of operating an eNodeB or base station according to a fourth embodiment of this disclosure.

As shown in FIG. 30, an eNodeB pairs two UEs (UE#0 and UE#1) for a time-frequency resource (block 3001). The eNodeB receives TB#1 for UE#0 and TB#1 for UE#1 from a higher layer (block 3003). The eNodeB then maps CW#0 to layer #0 and maps CW#1 to layer #1 (block 3005). The eNodeB also precodes the data stream and the associated DMRS for UE#0 (layer #0) and UE#1 (layer #1) (block 3007). The eNodeB then maps the DMRS in REs for DRS #0 for UE#0 and maps the DMRS in REs for DRS #1 for UE#1 (block 3009). The eNodeB also maps the combination of the two precoded signals for the two UEs in the data REs (block 3011). The eNodeB then disables TB#2 and clears the TB-to-CW swap bit in the DL grant for UE#0, and disables TB#2 and sets the TB-to-CW swap bit in the DL grant for UE#1 (block 3013). The eNodeB then transmits the two DL grants and data signals to the two UEs (block 3015).

In another transmission instance (denoted by transmission instance A-4-2), an eNodeB schedules only one UE in a time-frequency resource and transmits two streams, stream #0 and stream #1, to the UE.

In another transmission instance (denoted by transmission instance A-4-3), an eNodeB schedules only one UE in a time-frequency resource and transmits one stream, either stream #0 or stream #1, to the UE. When stream #0 is to be sent to the UE, the eNodeB sends a transmission grant with CW#0 enabled and TB1# mapped to CW#0. When stream #1 is to be sent to the UE, the eNodeB sends a transmission grant with CW#1 enabled and TB#1 mapped to CW#1.

In transmission instance A-4-1, a UE that has received a downlink grant in a CCE aggregation that is located in the left hand side of the tree in the UE-specific search space estimates the channels using the received signals in the REs for DRS#0, while another UE that has received a downlink grant in a CCE aggregation that is located in the right hand side of the tree in the UE-specific search space estimates the channels using the received signals in the REs for DRS#1. These estimated channels are used for the demodulation of the data stream at each UE.

Figure 31:
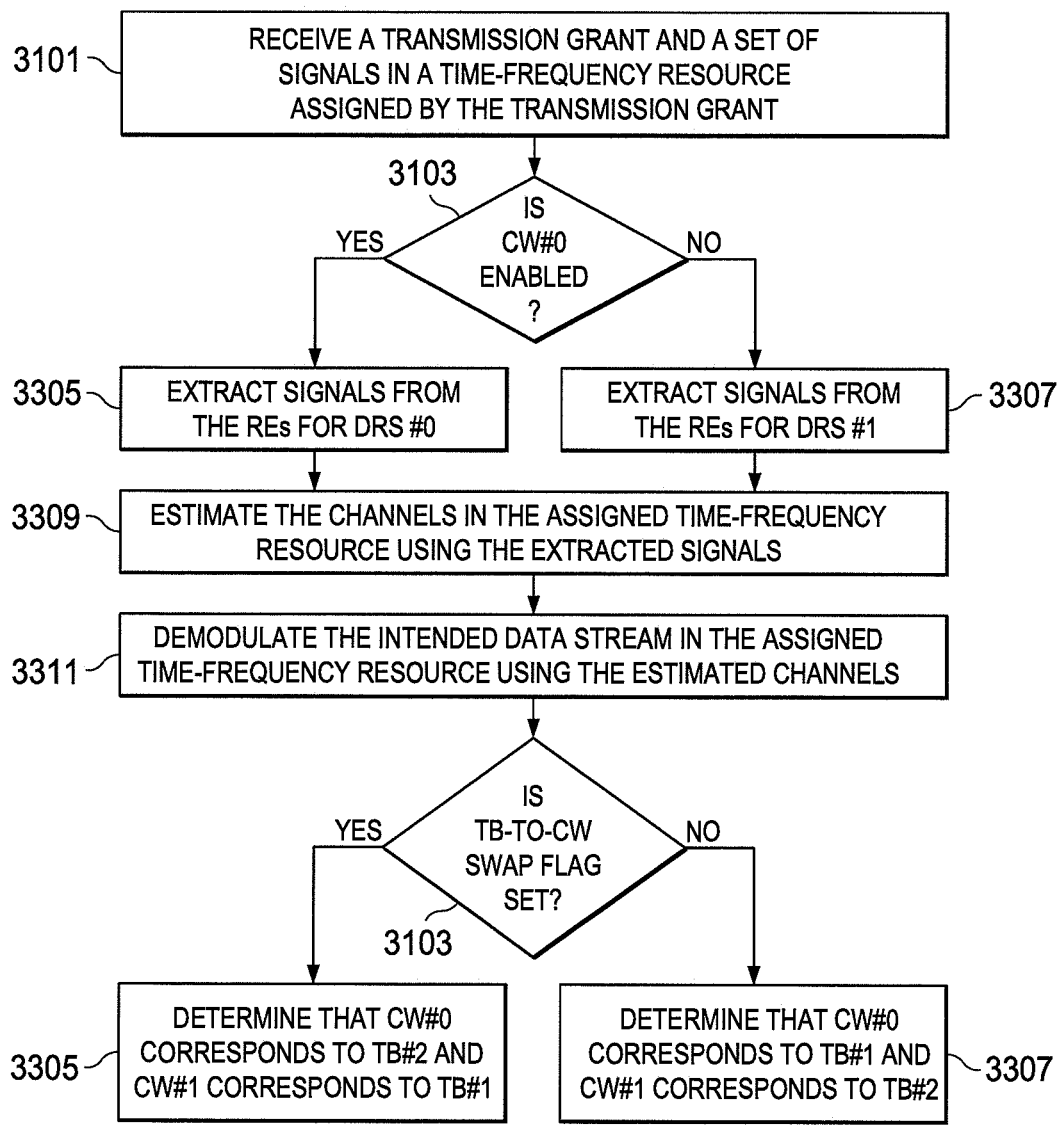
FIG. 31 illustrates a method of operating a UE or subscriber station according to a fourth embodiment of this disclosure.

FIG. 31 illustrates a method 3100 of operating a UE or subscriber station according to a fourth embodiment of this disclosure.

As shown in FIG. 31, a UE receives a transmission grant and a set of signals in a time-frequency resource assigned by the transmission grant from an eNodeB (block 3101). The UE then determines if the CW#0 in the transmission grant is enabled (block 3103). If the CW#0 in the transmission grant is enabled, the UE extracts signals from the REs for DRS#0 (block 3105). If the CW#1 in the transmission grant is enabled, the UE extracts signals from the REs for DRS#1 (block 3107). The UE then estimates the channels in the assigned time-frequency resource using the extracted signals (block 3109). The UE also demodulates the intended data stream in the assigned time-frequency resource using the estimated channels (block 3111). The UE also determines if the TB-to-CW swap flag in the transmission grant is set (block 3113). If the TB-to-CW swap flag in the transmission grant is set, the UE determines that CW#0 corresponds to TB#2 and CW#1 corresponds to TB#1 (block 3115). If the TB-to-CW swap flag in the transmission grant is not set, the UE determines that CW#0 corresponds to TB#1 and CW#1 corresponds to TB#2 (block 3117).

In transmission instance A-4-2, a UE estimates two channels using the received signals in the REs for both DRS#0 and DRS#1. The two estimated channels are used for the demodulation of the two data streams at the UE.

In transmission instance A-4-3, a UE estimates one channel using the received signals in the REs for DRS#0 if the UE has received a downlink grant indicating that only CW#0 is enabled, and uses the received signals in the REs for DRS#1 if the UE has received a downlink grant indicating that only CW#1 is enabled.

In methods A-1, A-2, A-3 and A-4, the estimated channels are used for the demodulation of the data stream at each UE. UE#0 (UE#1) may also estimate channels using the received signals in REs for DRS#1 (DRS#0) as well to figure out the statistics of the interfering signal. Once UE#0 (UE#1) figures out the statistics of the interfering signal, the UE may use the information to further improve the demodulation performance. UE#0 (UE#1) may implement a minimum-mean squared error (MMSE) estimator utilizing the two channel statistics for the demodulation.

In a second part of this disclosure, UEs in transmission mode B are considered. In transmission mode B, a UE can receive up to two streams and up to two DRSs associated with the two streams, and an eNodeB can schedule up to four data streams and up to four DRSs to a number of UEs in a unit of time-frequency resource. In this transmission mode, UEs are aware that the DRS REs for the four DRSs do not carry data symbols for themselves. In a particular embodiment, a type of RS pattern, such as the reference signal pattern 620 of FIG. 6, is considered. In this type of RS pattern, one set of DRS REs are reserved for streams 0 and 1, while another set of distinct DRS REs are reserved for streams 2 and 3. The first and the second set of DRS REs are referred to as DRS RE set 0 and DRS RE set 1, respectively.

FIG. 32 illustrates a table 3200 used to indicate a number of streams according to an embodiment of this disclosure.

In the following embodiments, methods of indicating at most two stream (and corresponding DRS) indices to a UE by an eNodeB by conveying information on the DRS RE set and the stream indices within the set in the downlink grant are disclosed. In such embodiments, the eNodeB may indicate up to six different sets of stream indices, as summarized in table 3200.

FIG. 33 illustrates the use of a DRS set indicator flag to indicate a DRS RE set index according to an embodiment of this disclosure.

In one embodiment of this disclosure, an additional field, the DRS set indicator flag, is added to the downlink grant to indicate the DRS RE set index (or I_set), so that a UE receiving the DL grant identifies the DRS REs intended for itself and uses the DRS REs to estimate the channels for the demodulation of the assigned streams. The DRS set indicator flag identifies the DRS RE set. For example, as shown in FIG. 33, when DRS set indicator flag is 0, the DRS RE set 0 is selected. When DRS set indicator flag is 1, the DRS RE set 1 is selected. FIG. 33 illustrates the implication of a bit value in the DRS set indicator flag when the CDM/FDM pattern of the reference signal pattern 620 of FIG. 6 is used as a DRS pattern.

When the DRS set indicator flag is carried in the DL grant, the stream index within the set (I_stream_set) can be conveyed either explicitly by additional bit field, or implicitly by using the method A-4.

FIG. 34 illustrates a DCI format according to an embodiment of this disclosure.

In this embodiment, a new DCI format 3400 adds two additional fields to format 1A: a 1-bit DRS set indicator flag 3401 used to determine I_set, and a 1-bit stream indicator field 3403 used to indicate the stream index within the set, or I_stream_set. In a particular embodiment, an eNodeB can indicate one stream index in the downlink grant, 0, 1, 2 or 3, as shown in table 3200.

FIG. 35 illustrates a DCI format according to another embodiment of this disclosure.

In this embodiment, a new DCI format 3500 adds an additional field to DCI format 2A, a 1-bit DRS set indicator flag 3501. When the DRS set indicator flag 3501 is set to 0, this implies that the UE will receive the DRS in DRS RE set 0. When the DRS set indicator flag 3501 is set to 1, this implies that the UE will receive the DRS in DRS RE set 1.

Figures 36, 37:
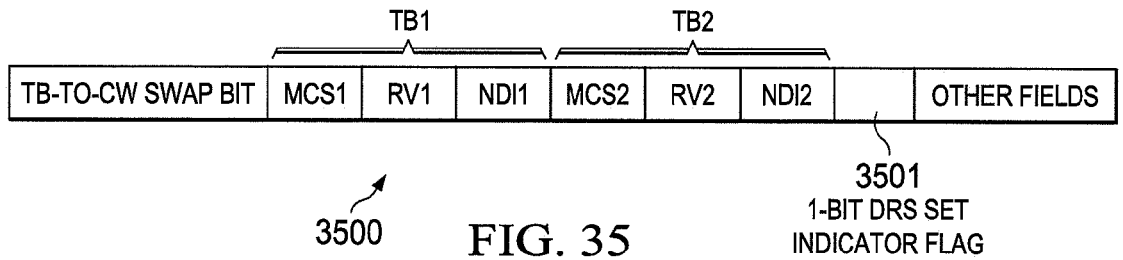
FIG. 36 illustrates a table used to map assigned DRSs or stream indices according to an embodiment of this disclosure.
FIG. 37 illustrates a use of bit values in the DRS set indicator flag and DRS set number flag according to an embodiment of this disclosure.

FIG. 36 illustrates a table 3600 used to map assigned DRSs or stream indices according to an embodiment of this disclosure.

When method A-4 is used together with DCI format 3500, up to two DRS (or stream) indices in the selected set may be indicated by the 1-bit DRS set indicator flag. Table 3600 lists the mapping from the possible combinations of the values of the enabled CWs and the DRS set indicator flag to the assigned DRSs or stream indices.

In a third part of this disclosure, UEs in transmission mode C will be considered. In transmission mode C, a UE can receive up to two streams and up to two DRSs associated with the two streams, and an eNodeB can schedule up to four data streams and up to four DRSs to a number of UEs in a unit of time-frequency resource, just as in transmission mode B. The difference between transmission mode C and transmission mode B is that each UE in transmission mode C receives an indication from an eNodeB as to which DRSs are allocated for the UE and other UEs in the assigned resources and thus is aware of the exact position of DRS REs that do not carry data symbols. In a type of RS pattern such as that shown in the reference signal pattern 620 of FIG. 6, one set of DRS REs are reserved for streams 0 and 1, while another set of distinct DRS REs are reserved for streams 2 and 3. The first and the second set of DRS REs are referred to as DRS RE set 0 and DRS RE set 1, respectively.

In an embodiment of this disclosure, a method and system of indicating a set of at most two stream (and corresponding DRS) indices by an eNodeB to a UE and indicating whether the other set of DRS REs contains data symbols for the UE or not is provided.

In one embodiment of this disclosure, a method and system for an eNodeB not only to indicate at most two stream (and corresponding DRS) indices to a UE by conveying information on the DRS RE set and the stream indices within the set in the downlink grant, but also to indicate whether the other set of DRS REs are carrying data or not by specifying the number of DRS RE sets (N_set).

FIG. 37 illustrates a use of bit values in the DRS set indicator flag and DRS set number flag according to an embodiment of this disclosure.

In a particular embodiment, two additional fields, the DRS set indicator flag (I_set) and the set number field (N_set), are added to the downlink grant to indicate the DRS set index.

Upon receiving the DRS set indicator flag, a UE identifies the DRS REs intended for itself and uses the DRS REs to estimate the channels for the demodulation of the assigned streams. Upon receiving the set number flag, a UE is informed as to whether data symbols are in the other DRS RE set or not. The DRS set indicator flag identifies the DRS RE set. For example, when DRS set indicator flag is 0, the DRS RE set 0 is selected; when DRS set indicator flag is 1, the DRS RE set 1 is selected. On the other hand, the set number field identifies the number of DRS RE sets. For example, if the set number flag is 0, then the number of DRS RE sets is one. In this case, the UE can receive data symbols in the REs in the other DRS RE set which the UE does not receive DRSs. If the set number flag is 1, then the number of DRS RE sets is two. In this case, the UE does not expect to receive data symbols in the REs in the other DRS RE set which the UE does not receive DRSs. FIG. 37 illustrates the implication of bit values in the DRS set indicator flag and DRS set number flag when the reference signal pattern 620 of FIG. 6, for example, is used as a DRS pattern.

FIG. 38 illustrates a DCI format according to a further embodiment of this disclosure.

In this embodiment, a new DCI format 3800 adds three additional fields to format 1A: a 1-bit DRS set indicator flag 3801 used to determine I_set, a one-bit stream indicator field 3803 used to indicate the stream index within the set, or I_stream_set, and a one-bit DRS set number field 3805 used to indicate whether the other set of DRS REs carry data or not. In this embodiment, an eNodeB can indicate one stream index in the downlink grant, 0, 1, 2 or 3 as shown table 3200, and indicate whether the other set of DRS REs carry data or not as shown in FIG. 37.

FIG. 39 illustrates a DCI format according to a yet another embodiment of this disclosure.

In this embodiment, a new DCI format 3900 adds two additional fields to DCI format 2A: a 1-bit DRS set indicator flag 3901 and a 1-bit DRS set number field 3903. When the DRS set indicator flag is 0, this implies that the UE will receive the DRS in DRS RE set 0. When the DRS set indicator flag is 1, this implies that the UE will receive the DRS in DRS RE set 1.

In a fourth part of this disclosure, UEs in transmission mode D will be considered. In transmission mode D, a UE can receive up to four streams and up to four DRSs associated with the four streams, and an eNodeB can schedule up to four data streams and up to four DRSs to a number of UEs in a unit of time-frequency resource. In this transmission mode, each UE receives an indication from an eNodeB as to which DRSs are allocated for the UE and thus is aware that the DRS REs for the four DRSs do not carry data symbols for themselves.

In another embodiment, a system and method of indicating a set of stream (and corresponding DRS) indices to a UE by an eNodeB is disclosed.

FIG. 40 illustrates a DCI format according to a yet further embodiment of this disclosure.

In this embodiment, an additional field, the DRS allocation bitmap, is added to the downlink grant to indicate the assigned DRS indices, so that a UE receiving the DL grant can identify the DRS REs intended for itself and use the DRS REs to estimate the channels for the demodulation of the assigned streams. The number of bits in the DRS allocation bitmap is the same as the total number of streams that can be multiplexed in a time-frequency resource. If a bit in the i-th position in the DRS allocation bitmap is 0 in a DL grant for a UE, this implies that stream i−1 and DRS i−1 are transmitted to the UE. Otherwise, stream i−1 and DRS i−1 are not transmitted to the UE. For example, when DRS allocation bitmap is [0 1 0 1], streams (and DRSs) 1 and 3 are allocated to the UE, while streams (and DRSs) 0 and 2 are not allocated to the UE.

In one example, the DRS allocation bitmap field has four bits, where each bit indicates whether a corresponding stream and DRS is allocated for a UE receiving the DL grant. The new DCI format 4000 has an additional field, a 4-bit DRS allocation bitmap 4001, to DCI format 2A.

FIG. 41 illustrates a table 4100 used to map assigned DRSs or stream indices according to another embodiment of this disclosure.

In this embodiment, an additional field is added to DCI format 2A. A DRS allocation map is added to the downlink grant. The DRS allocation map together with the enabled CWs indicates the assigned DRS indices, so that a UE receiving the DL grant identifies the DRS REs intended for itself and uses the DRS REs to estimate the channels for the demodulation of the assigned streams. Table 4100 illustrates one example of method A-4 being used with a 3-bit DRS allocation map field.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A subscriber station, comprising:
a receive path circuitry configured to receive a downlink transmission grant and a Physical Downlink Shared CHannel (PDSCH) from a base station, the downlink transmission grant using at least one of a cell radio network temporary identifier (C-RNTI) and a semi-persistent scheduling (SPS)C-RNTI,
wherein, if the downlink transmission grant is acquired using the C-RNTI, and if the downlink transmission grant utilizes a first downlink control information (DCI) format, then the receive path circuitry is configured to determine that transmission of the PDSCH by the base station uses a transmit diversity transmission scheme or a single antenna-port scheme,
if the downlink transmission grant is acquired using the C-RNTI, and if the downlink transmission grant utilizes a second DCI format, then the receive path circuitry is configured to determine that transmission of the PDSCH by the base station uses a dual-dedicated reference signal (DRS) port transmission scheme or a single-DRS port transmission scheme,
if the downlink transmission grant is acquired using the SPS C-RNTI, and if the downlink transmission grant utilizes the first DCI format, then the receive path circuitry is configured to determine that transmission of the PDSCH by the base station uses a single-DRS port transmission scheme, and
if the downlink transmission grant is acquired using the SPS C-RNTI, and if the downlink transmission grant utilizes the second DCI format, then the receive path circuitry is configured to determine that transmission of the PDSCH by the base station uses a single-DRS port transmission scheme.

2. The subscriber station in accordance with claim 1, wherein, if the downlink transmission grant utilizes the first DCI format, a search space for a Physical Downlink Control CHannel (PDCCH) includes both common channels and user equipment (UE)-specific channels by C-RINTI, and wherein, if the downlink transmission grant utilizes the second DCI format, the search space for the PDCCH includes only the UE-specific channels by C-RINTI.

3. The subscriber station in accordance with claim 1, wherein a first value for a new data indicator (NDI) field of a disable transport block indicates that the single-DRS port transmission utilizes a first antenna port, and wherein a second value for the NDI field indicates that the single-DRS port transmission utilizes a second antenna port.

4. The subscriber station in accordance with claim 1, wherein if a dual-layer beamforming format is used to indicate a single-DRS port transmission scheme, the subscriber station is further configured to determine a DRS port index of an enabled transport block in the downlink transmission grant using a value in a new data indicator field of the dual-layer beamforming format.

5. The subscriber station in accordance with claim 1, wherein if a dual-layer beamforming format is used to indicate a single-DRS port transmission scheme, the subscriber station is further configured to determine a DRS port index of an enabled codeword in the downlink transmission grant using a value in a new data indicator field of the dual-layer beamforming format.

6. A method, comprising:
receiving a downlink transmission grant and a Physical Downlink Shared CHannel (PDSCH) from a base station, the downlink transmission grant using at least one of a cell radio network temporary identifier (C-RNTI) and a semi-persistent scheduling (SPS)C-RNTI,
wherein, if the downlink transmission grant is acquired using the C-RNTI, and if the downlink transmission grant utilizes a first downlink control information (DCI) format, then determining that transmission of the PDSCH by the base station uses a transmit diversity transmission scheme or a single antenna-port scheme,
if the downlink transmission grant is acquired using the C-RNTI, and if the downlink transmission grant utilizes a second DCI format, then determining that transmission of the PDSCH by the base station uses a dual-dedicated reference signal (DRS) port transmission scheme or a single-DRS port transmission scheme,
if the downlink transmission grant is acquired using the SPS C-RNTI, and if the downlink transmission grant utilizes the first DCI format, then determining that transmission of the PDSCH by the base station uses a single-DRS port transmission scheme, and
if the downlink transmission grant is acquired using the SPS C-RNTI, and if the downlink transmission grant utilizes the second DCI format, then determining that transmission of the PDSCH by the base station uses a single-DRS port transmission scheme.

7. The method in accordance with claim 6, wherein, if the downlink transmission grant utilizes the first DCI format, a search space for a Physical Downlink Control CHannel (PDCCH) includes both common channels and user equipment (UE)-specific channels by C-RINTI, and wherein, if the downlink transmission grant utilizes the second DCI format, the search space for the PDCCH includes only the UE-specific channels by C-RINTI.

8. The method in accordance with claim 6, wherein a first value for a new data indicator (NDI) field of a disable transport block indicates that the single-DRS port transmission utilizes a first antenna port, and wherein a second value for the NDI field indicates that the single-DRS port transmission utilizes a second antenna port.

9. The method in accordance with claim 6, wherein if a duallayer beamforming format is used to indicate a single-DRS port transmission scheme, then determining a DRS port index of an enabled transport block in the downlink transmission grant using a value in a new data indicator field of the dual-layer beamforming format.

10. The method in accordance with claim 6, wherein if a dual-layer beamforming format is used to indicate a single-DRS port transmission scheme, then determining a DRS port index of an enabled codeword in the downlink transmission grant using a value in a new data indicator field of the dual-layer beamforming format.

11. A base station, comprising:
a transmit path circuitry configured to scramble cyclic redundancy check (CRC) bits of a downlink control information (DCI) of either a first or a second DCI format using either a cell radio network temporary identifier (C-RNTI) for dynamic scheduling or a semi-persistent scheduling (SPS)C-RNTI for semi-persistent scheduling,
the transmit path circuitry further configured to transmit the DCI and a Physical Downlink Shared CHannel (PDSCH) scheduled by the DCI to a subscriber station,
wherein, if the C-RNTI is used to scramble the CRC bits and the DCI is of the first DCI format, then the PDSCH is transmitted using a transmit diversity scheme or a single antenna-port scheme;
if the C-RNTI is used to scramble the CRC bits and the DCI is of the second DCI format, then the PDSCH is transmitted using a dual-dedicated reference signal (DRS) port transmission scheme or a single-DRS port transmission scheme,
if the SPS C-RNTI is used to scramble the CRC bits and the DCI is of the first DCI format, then the PDSCH is transmitted using a single-DRS port transmission scheme;
if the SPS C-RNTI is used to scramble the CRC bits and the DCI is of the second DCI format, then the PDSCH is transmitted using a single-DRS port transmission scheme.

12. The base station in accordance with claim 11, wherein, if the downlink transmission grant utilizes the first DCI format, a search space for a Physical Downlink Control CHannel (PDCCH) includes both common channels and user equipment (UE)-specific channels by C-RINTI, and wherein, if the downlink transmission grant utilizes the second DCI format, the search space for the PDCCH includes only the UE-specific channels by C-RINTI.

13. The base station in accordance with claim 11, wherein a first value for a new data indicator (NDI) field of a disable transport block indicates that the single-DRS port transmission utilizes a first antenna port, and wherein a second value for the NDI field indicates that the single-DRS port transmission utilizes a second antenna port.

14. The base station in accordance with claim 11, wherein the transmit path circuitry configured, if the SPS C-RNTI is used to scramble the CRC bits, to generate a downlink transmission grant using the DCI format that is the fallback format to indicate a single-DRS port transmission scheme, and to transmit the downlink transmission grant in a common or user equipment-specific search space of the Control Channel Elements (CCE) domain.

15. The base station in accordance with claim 11, wherein the transmit path circuitry configured to generate a downlink transmission grant using the DCI format that is the duallayer beamforming format to indicate a dual-DRS port transmission scheme or a single-DRS port transmission scheme, and to transmit the downlink transmission grant in a user equipment-specific search space of the Control Channel Elements (CCE) domain.

16. A method, comprising:
scrambling cyclic redundancy check (CRC) bits of a downlink control information (DCI) of either a first or a second DCI format using either a cell radio network temporary identifier (C-RNTI) for dynamic scheduling or a semi-persistent scheduling (SPS)C-RNTI for semi-persistent scheduling; and
transmitting the DCI and a Physical Downlink Shared CHannel (PDSCH) scheduled by the DCI to a subscriber station,
wherein, if the C-RNTI is used to scramble the CRC bits and the DCI is of the first DCI format, then the PDSCH is transmitted using a transmit diversity scheme or a single antenna-port scheme;
if the C-RNTI is used to scramble the CRC bits and the DCI is of the second DCI format, then the PDSCH is transmitted using a dual-dedicated reference signal (DRS) port transmission scheme or a single-DRS port transmission scheme,
if the SPS C-RNTI is used to scramble the CRC bits and the DCI is of the first DCI format, then the PDSCH is transmitted using a single-DRS port transmission scheme;
if the SPS C-RNTI is used to scramble the CRC bits and the DCI is of the second DCI format, then the PDSCH is transmitted using a single-DRS port transmission scheme.

17. The method in accordance with claim 16, wherein, if the downlink transmission grant utilizes the first DCI format, a search space for a Physical Downlink Control CHannel (PDCCH) includes both common channels and user equipment (UE)-specific channels by C-RINTI, and wherein, if the downlink transmission grant utilizes the second DCI format, the search space for the PDCCH includes only the UE-specific channels by C-RINTI.

18. The method in accordance with claim 16, wherein a first value for a new data indicator (NDI) field of a disable transport block indicates that the single-DRS port transmission utilizes a first antenna port, and wherein a second value for the NDI field indicates that the single-DRS port transmission utilizes a second antenna port.

19. The method in accordance with claim 16, further comprising: if the SPS C-RNTI is used to scramble the CRC bits, generating a downlink transmission grant using the DCI format that is the fallback format to indicate a single-DRS port transmission scheme, and transmitting the downlink transmission grant in a common or user equipment-specific search space of the Control Channel Elements (CCE) domain.

20. The method in accordance with claim 16, further comprising: generating a downlink transmission grant using the DCI format that is the dual-layer beamforming format to indicate a dual-DRS port transmission scheme or a single-DRS port transmission scheme, and transmitting the downlink transmission grant in a user equipment-specific search space of the Control Channel Elements (CCE) domain.

* * * * *

UNITED STATES PATENT AND TRADEMARK OFFICE
CERTIFICATE OF CORRECTION

PATENT NO.       : 9,585,136 B2                                                Page 1 of 1
APPLICATION NO. : 14/457718
DATED            : February 28, 2017
INVENTOR(S)      : Nam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this
Twenty-fifth Day of September, 2018

Andrei Iancu
*Director of the United States Patent and Trademark Office*